US010250720B2

(12) United States Patent
Clement et al.

(10) Patent No.: US 10,250,720 B2
(45) Date of Patent: Apr. 2, 2019

(54) SHARING IN AN AUGMENTED AND/OR VIRTUAL REALITY ENVIRONMENT

(71) Applicant: Google Inc., Mountain View, CA (US)

(72) Inventors: Manuel Christian Clement, Felton, CA (US); Stefan Welker, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/386,614

(22) Filed: Dec. 21, 2016

(65) Prior Publication Data

US 2017/0324841 A1 Nov. 9, 2017

Related U.S. Application Data

(60) Provisional application No. 62/332,314, filed on May 5, 2016.

(51) Int. Cl.
| | |
|---|---|
| *H04L 29/06* | (2006.01) |
| *G06F 3/01* | (2006.01) |
| *G06F 3/0484* | (2013.01) |
| *G06F 3/048* | (2013.01) |
| *A63F 13/428* | (2014.01) |
| *A63F 13/573* | (2014.01) |

(52) U.S. Cl.
CPC ............ *H04L 67/38* (2013.01); *A63F 13/428* (2014.09); *A63F 13/573* (2014.09); *G06F 3/011* (2013.01); *G06F 3/017* (2013.01); *G06F 3/048* (2013.01); *A63F 2300/8082* (2013.01); *G06F 3/04842* (2013.01)

(58) Field of Classification Search
CPC ...... H04L 67/38; A63F 13/573; A63F 13/428; G06F 3/048; G06F 3/011; G06F 3/017; G06F 3/04842
See application file for complete search history.

(56) References Cited

U.S. PATENT DOCUMENTS

| | | |
|---|---|---|
| 9,215,293 B2 | 12/2015 | Miller et al. |
| 9,392,212 B1 | 7/2016 | Ross |
| (Continued) | | |

OTHER PUBLICATIONS

International Search Report and Written Opinion for PCT Application No. PCT/US2016/068255, dated Apr. 10, 2017, 14 pages.

*Primary Examiner* — Andrew Sasinowski
(74) *Attorney, Agent, or Firm* — Brake Hughes Bellermann LLP

(57) ABSTRACT

In a system and method for sharing items in an augmented and/or virtual reality environment, selected virtual items may be virtually propelled using, for example, a tossing or throwing motion, to a target recipient, so that the selected item may be shared with the target recipient without direct physical and/or virtual contact with the target recipient. Movement of a user's hand may be detected and tracked, so that the intended target recipient for the shared item may be identified based on a projected trajectory of a throwing motion of the user's hand. Associations between the user and different target recipients may cause different possible target recipients to exhibit different attractive forces, or different levels of magnetism, for particular items being tossed or thrown by a user for sharing, to further differentiate between the possible target recipients, and resolve recipient ambiguity.

18 Claims, 24 Drawing Sheets

(56) References Cited

U.S. PATENT DOCUMENTS

| | | | |
|---|---|---|---|
| 2003/0156144 A1* | 8/2003 | Morita | G06F 3/011 |
| | | | 715/848 |
| 2009/0307623 A1* | 12/2009 | Agarawala | G06F 3/04815 |
| | | | 715/765 |
| 2010/0113140 A1 | 5/2010 | Kelly et al. | |
| 2010/0257251 A1 | 10/2010 | Mooring et al. | |
| 2013/0019184 A1 | 1/2013 | Vonog et al. | |
| 2013/0130758 A1* | 5/2013 | Moore | A63F 13/12 |
| | | | 463/2 |
| 2014/0368537 A1* | 12/2014 | Salter | G06T 19/006 |
| | | | 345/633 |
| 2015/0379964 A1* | 12/2015 | Lee | G09G 5/12 |
| | | | 345/173 |
| 2016/0269508 A1 | 9/2016 | Amjadi et al. | |

\* cited by examiner

SHARING IN AN AUGMENTED AND/OR VIRTUAL REALITY ENVIRONMENT

CROSS REFERENCE TO RELATED APPLICATION(S)

This application is a Non-Provisional of, and claims priority to, U.S. Provisional Application No. 62/332,314, filed on May 5, 2016, which is incorporated by reference herein in its entirety.

FIELD

This application relates, generally, to item transfer and/or sharing in a virtual reality and/or augmented reality environment.

BACKGROUND

An augmented reality (AR) system and/or a virtual reality (VR) system may generate a three-dimensional (3D) immersive augmented and/or virtual reality environment. A user may experience this immersive environment through interaction with various electronic devices such as a helmet or other head mounted device including a display, glasses or goggles. A user may move through and interact with elements in the virtual environment as well as other users in the virtual space through, for example, hand/arm gestures, manipulation of external devices operably coupled to the head mounted device, and the like.

SUMMARY

In one aspect, a computer-implemented method may include generating, by a computing device operating in an ambient environment, a virtual environment; receiving, by a processor of the computing device, a selection of a virtual item by a selection device in virtual contact with the selected virtual item; tracking movement of the selection device in virtual contact with the selected virtual item, and projecting a virtual trajectory for propulsion of the selected virtual item based on the tracked movement of the selection device in virtual contact with the selected virtual item; identifying an intended target recipient for the selected virtual item based on the projected virtual trajectory for the propulsion of the selected virtual item; and sharing the selected virtual item with the intended target recipient.

In another aspect, a computing device may include a memory storing executable instructions, and a processor configured to execute the instructions. Execution of the instructions may cause the computing device to generate a virtual environment; receive a selection of a virtual item by a selection device in virtual contact with the selected virtual item; track movement of the selection device in contact with the selected virtual item, and project a virtual trajectory for propulsion of the selected virtual item based on the tracked movement of the selected virtual item; identify an intended target recipient for the selected virtual item based on the projected virtual trajectory for the propulsion of the selected virtual item; and share the selected virtual item with the intended target recipient.

The details of one or more implementations are set forth in the accompanying drawings and the description below. Other features will be apparent from the description and drawings, and from the claims.

DETAILED DESCRIPTION

Figure 1A:
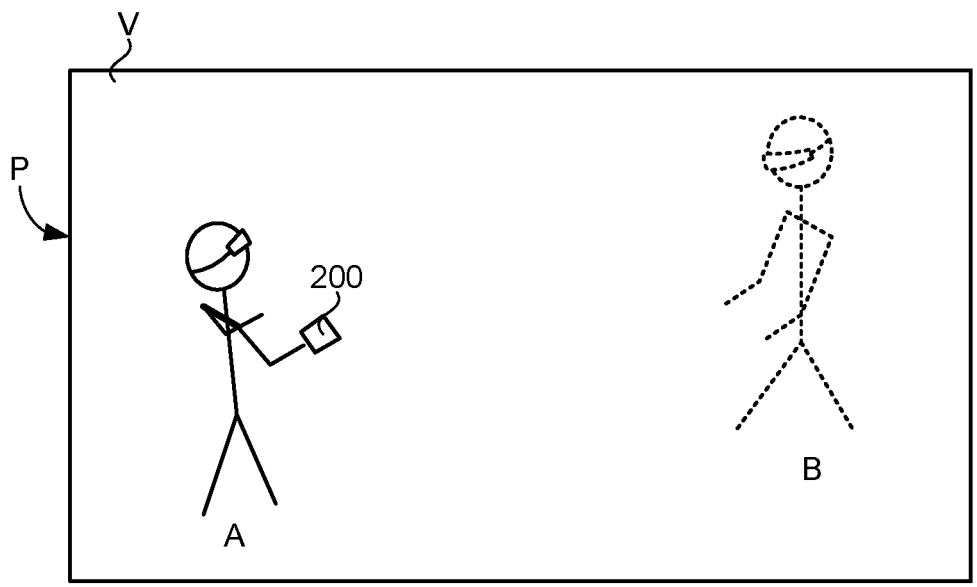
FIGS. 1A-1D illustrate an example implementation of item sharing, or throwing, in an augmented reality system and/or a virtual reality system, in accordance with implementations as described herein.

A user may experience an augmented reality (AR) environment and/or a 3D virtual reality (VR) environment generated by for example, a head mounted display (HMD) device, while using, for example, hand and/or arm gestures, a controller and the like to manipulate and/or interact with virtual objects in the virtual environment. To facilitate interaction with and/or manipulation of virtual objects in the virtual environment in this manner, a position and/or orientation of, for example, the user's hand, and/or a controller held by the user, may be detected, and the movement of the user's hand and/or handheld controller in the physical, real world environment may be tracked and translated into corresponding movement in the virtual environment for interaction with/manipulation of virtual objects in the virtual environment. In some situations, a user may want to transfer to, or share an item with a target recipient, such as, for example, another user in the virtual environment, another device, another virtual location for sharing, collaboration, storage and the like.

In a system and method for sharing in a virtual environment, in accordance with implementations as described herein, a user may trigger movement of an item to be shared with a target recipient such as, for example, another user, another virtual location, another device, and the like, to allow for sharing of the item in the virtual environment without, for example, a direct hand to hand transfer of the item, or a virtual hand to hand transfer of the item. This movement may be triggered by, for example, tossing, throwing or otherwise propelling the item toward the target recipient. This may allow the virtual item to be shared with the target recipient without having to be in close proximity in the virtual environment and/or have direct contact in the virtual environment between the user, and particularly the virtual counterpart of the user in the virtual environment, and the target recipient in order to pass the virtual item from the user to the target recipient. In some implementations, the user may also use this type of virtual moving (e.g., tossing, throwing or otherwise propelling) to sort, arrange, store, display, and the like, various different types of items in the virtual environment. In some implementations, the system may direct the movement of (e.g., tossing, throwing or otherwise propelling) of the item toward a particular target recipient based on one or more rules associated with, for example, the item being moved (e.g., tossed, thrown, propelled), available target recipients, and the like, so that the successful sharing of the item with the intended recipient does not rely only on the accuracy of the user's triggered movement toward the intended target recipient. This may enhance, or increase, the probability that the item is shared with the intended target recipient.

In a system and method for sharing in a virtual environment, in accordance with implementations as described herein, items that would not normally be propelled (i.e., tossed or thrown) in a real world environment, for example, items having associated metadata, may be propelled (i.e., tossed or thrown) to an intended target recipient to trigger another action. Items, such as, for example, files and the like, which would not normally be propelled in the real world environment, nor would their virtual representations typically be thrown in the virtual environment, may be propelled in order to trigger other actions in the virtual world environment, and/or in the real world environment.

Hereinafter, simply for ease of discussion and illustration, movement of selected item(s) from a first user to an intended target recipient for sharing, sorting, display and the like, will be described with respect to a tossing or throwing type of movement of the item by the user. However, the user may propel selected virtual item(s) in various other manners to convey the selected item(s) to the intended target recipient. Selection of a virtual item in the virtual space may, for example, occur through a virtual contact in the virtual space between a designated selection device such as, for example, the hand of a user in the virtual environment, hereinafter referred to as the "user's hand", or another selection device and a virtual item. This type of contact in the virtual environment will be referred to hereinafter as virtual contact. Propelling the virtual item, i.e. virtual propelling, causes the movement of the virtual item in the virtual environment to continue after the virtual contact between the virtual item and the user's hand ends, wherein the movement follows a virtual trajectory toward a target recipient.

The example implementation shown in FIGS. 1A-1D will be described with respect to a first user A in a real world, physical space P, immersed in a virtual environment V, and a second user B that is virtually present in the same virtual space V as the first user A. The first user A and the second user B may occupy the same physical space P, or may occupy separate physical spaces, while being present in the same virtual environment V. In the example shown in FIGS. 1A-1D, the virtual environment V is generated by an HMD 100 worn by the user, with the user's field of view confined to the virtual environment generated by the HIVID. However, the concepts and features described below with respect to FIGS. 1A-1D may also be applied to other types of HMDs, and other types of virtual reality environments and/or augmented reality environments.

Figure 1B:
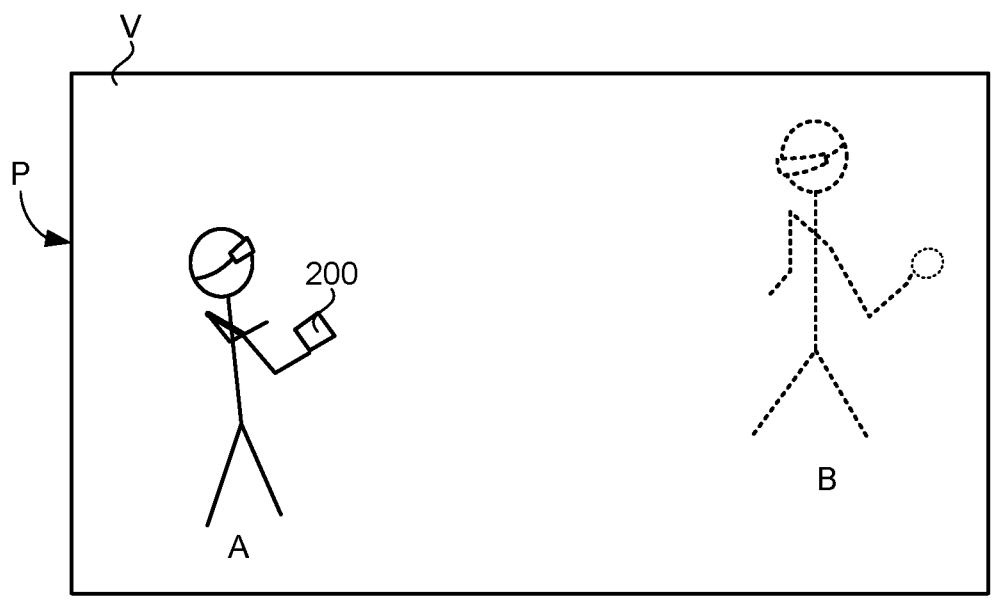
Figure 1C:
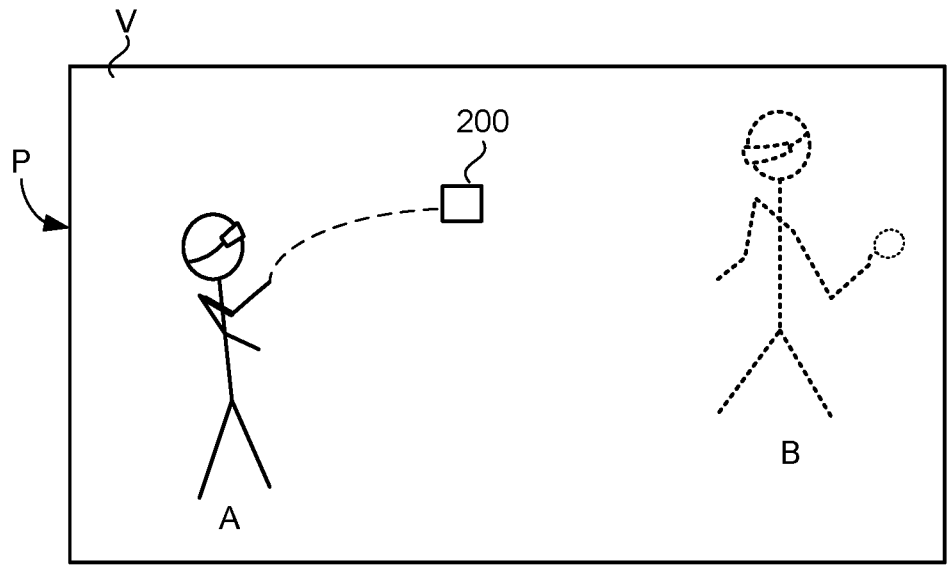
Figure 1D:
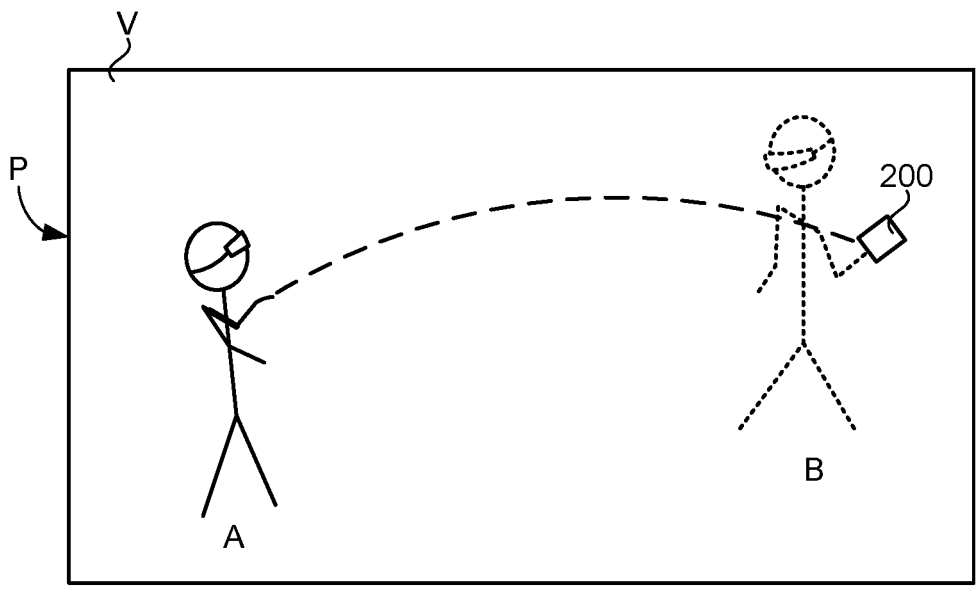

As shown in FIG. 1A, the user A may select, or retrieve, an item 200, such as, for example, a photo, a document, an audio file, a video file, a virtual object to be shared in an immersive virtual experience, and other such items. The user A may select the item 200 from, for example, a group or collection of items, using, for example, a hand gesture to interact with a menu or directory or folder of items available to the user A, manipulation of a controller, and the like. Once the user A has selected the item 200, the user may choose to share the item 200 with the user B. For example, the user A may toss, or throw, the item 200 to the user B to share the item 200 with the user B, the user B in this example being the user A's intended target recipient for the item 200. For example, as shown in FIG. 1B, in some implementations, a hand gesture by the user B may indicate a desire to receive the item 200, and/or a readiness to receive the item 200, from the user A, and/or may establish a virtual connection between the user A and the user B. In response to the hand gesture by the user B, the user A may toss or throw the item 200 to the user B, as shown in FIGS. 1C and 1D, to share the item with the user B. The user B may then view, store, or otherwise manipulate the received item 200.

In the example described above with respect to FIGS. 1A-1D, the user A manipulates and throws a single item 200 to the user B, with the user B defining an intended target for receiving the item 200. In this example, the user B establishes a connection with the user A, and identifies readiness to receive the item 200 by, for example, the hand gesture shown in FIG. 1B. However, in some implementations, a connection may already be established between the user A and the user B, through, for example, initiation of a shared virtual session, sharing of contact information and the like, establishing the user B as a possible target recipient for item(s) to be shared, by throwing, from the user A.

Similarly, in the example described above, the user A tosses, or throws, the item 200 to share the item 200 with the target recipient (in this example, the user B), in response to a gesture by the user B indicating a desire and/or a readiness to receive the item 200. However, in some implementations, the user A may toss, or throw, the item 200 to the target recipient (in this example, the user B) to share the item with the target recipient, without a gesture or other type of indication that the target recipient wants to and/or is ready to receive the item 200. In this situation, the user A may share the item 200 with the target recipient, such as the user B, allowing the user B to access the item 200.

In the example described above with respect to FIGS. 1A-1D, a position and/or orientation of the hand of the user A, and/or of a controller held by the user A, may be identified, and movement of the hand of the user A in the physical space P may be tracked and translated into a corresponding movement in the virtual environment V. Similarly, a position and orientation of the hand of the user B may be identified, and movement of the hand of the user B in the physical space P may be tracked and translated into a corresponding movement in the virtual environment V. Thus, the hand gesture by the user B described above with respect to FIG. 1B may be detected, tracked, and identified as an indication of readiness to receive the item 200 at, for example, a target recipient corresponding to the user B. Similarly, the movement of the hand of the user A may be detected and tracked, and a movement trajectory, and extension of the movement trajectory, of the hand of the user A may be identified as corresponding to a movement of item 200 from the user A to the user B along the extended trajectory leading to the target recipient corresponding to the user B.

In some implementations, movement of the user's hand may be tracked as described above as the user implements a similar tossing or throwing motion to sort and/or rearrange and/or stack and/or select one item, or a plurality of items, from a group of items. For example, as shown in FIGS. 2A-2F, a user may manipulate, sort through, re-arrange, distribute and the like, one or more items 251 through 259 of a group 250 of items using, for example hand gestures including tossing or throwing gestures as described above. In some circumstances, this sorting, re-arrangement, and the like may be done by the user A prior to sharing one or more of the items 251-259 with the user B as described above with respect to FIGS. 1A-1D.

In some implementations, when sorting, rearranging and the like in this manner, the items 251-259 and particularly, the content of the items 251-259 may remain private to the user A, before sharing with the target recipient, to maintain privacy and security of the content of the items 251-259, even when the target recipient is, for example, the user B in the shared virtual environment. In some implementations, when sorting, rearranging and the like in this manner, the items 251-259 may be visible to both the user A and the user B, for example to facilitate arrangement, collaboration, sharing and the like.

Figure 2A:
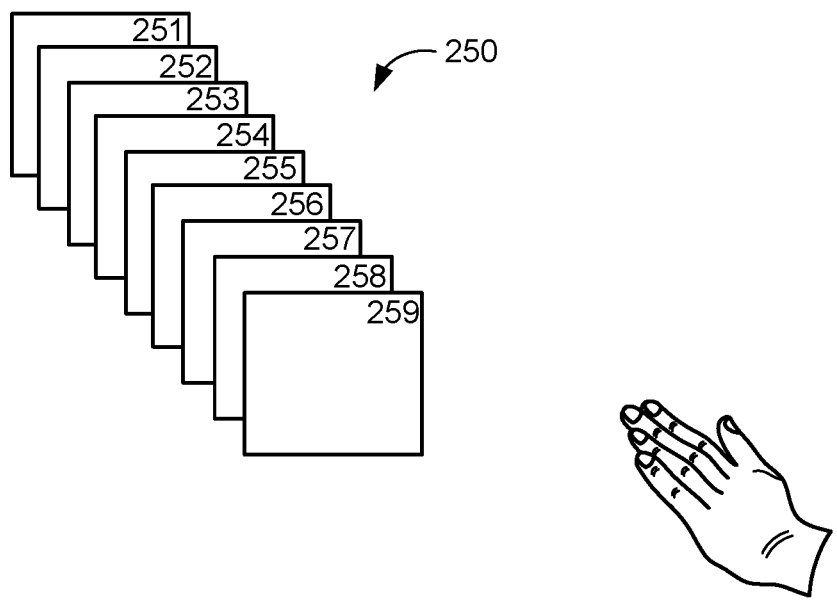
FIGS. 2A-2F and 3A-3B illustrate example implementations of item moving and/or sorting by throwing in an augmented and/or virtual reality system, in accordance with implementations as described herein.
Figure 2B:
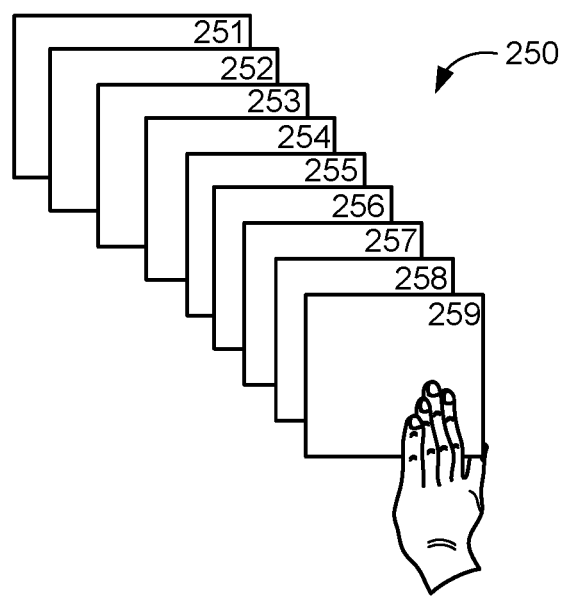
Figure 2C:
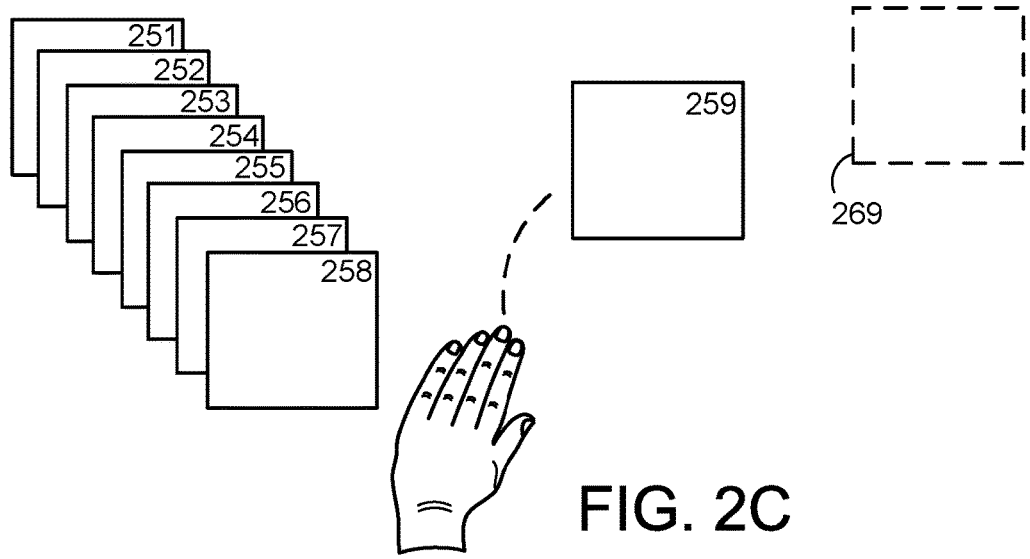
Figure 2D:
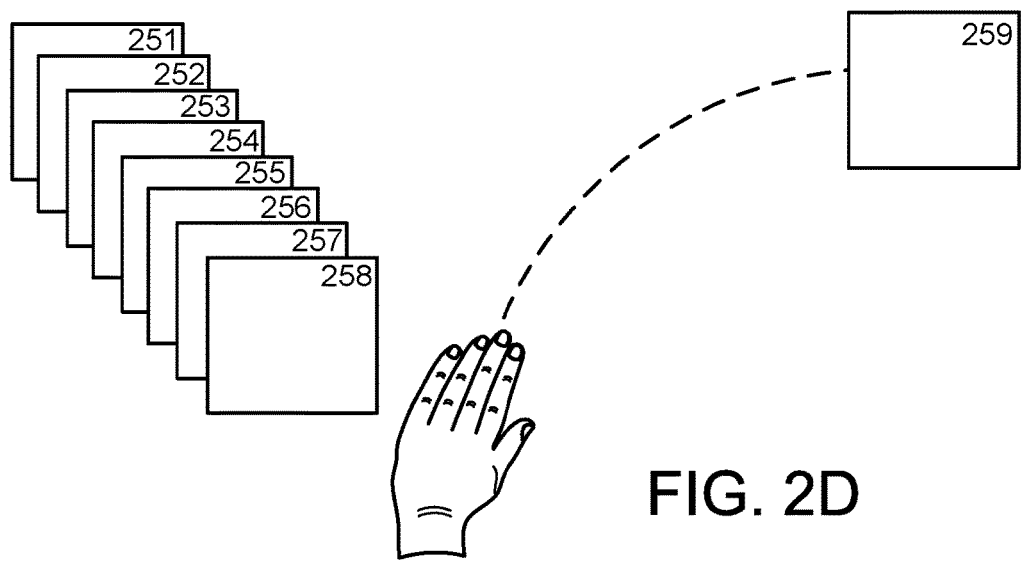
Figure 2E:
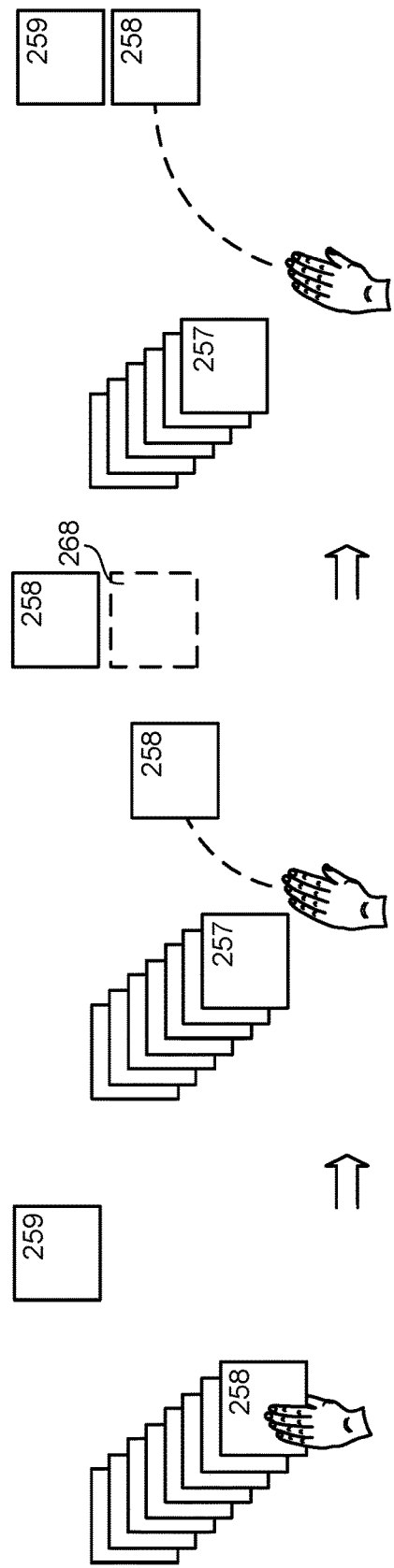
Figure 2F:
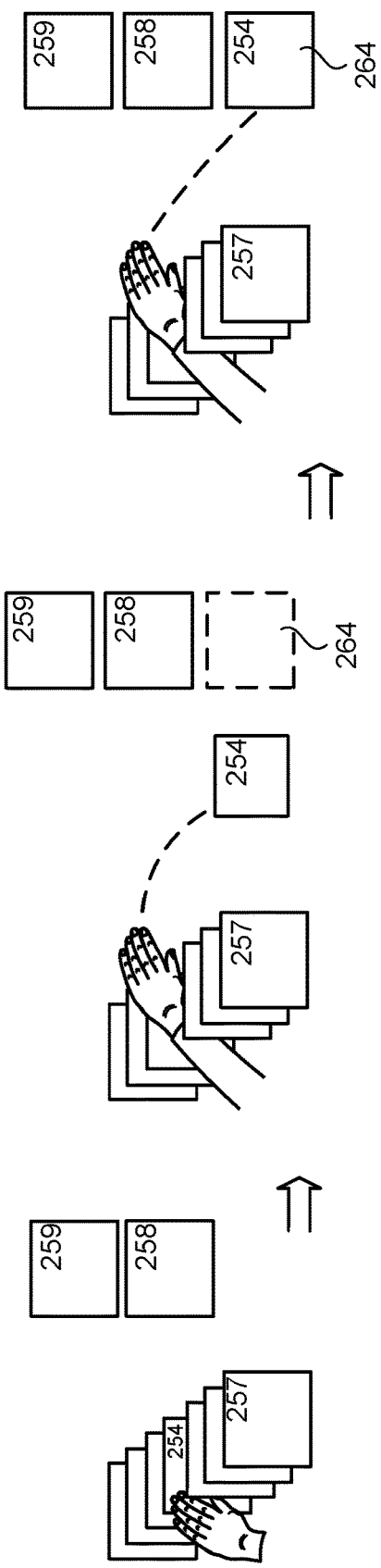

As shown in the example illustrated in FIGS. 2A-2B, the user may select an item from the group 250 of items, for example, item 259, for movement or sorting. Once selected, in response to a tossing or throwing gesture as described above, the selected item 259 may be tossed or thrown to, for example, a target area 269, as shown in FIGS. 2C-2D. FIG. 2C shows that a virtual contact between the user's hand and virtual item 259, which is shown in FIG. 2B, has ended while the virtual item 259 continues to move, as shown in FIG. 2D, in the virtual environment along the trajectory toward target area 269. The target area 269 intended by the user to receive the selected item 259 may be determined based on, for example the tracking of the user's hand movement and associated trajectory, and/or other factors to be described in more detail below. Determining the intended target area in this manner, and in accordance with implementations described herein, enables an intuitive, reliable, and efficient interaction in the virtual environment for conveying a selected virtual item toward a target area in the virtual environment. This type of interaction may be relatively intuitive to a user, as it corresponds to a tossing or throwing type of movement of the selected item in the virtual environment, and as it can be can be triggered and controlled by a physical tossing or throwing type of movement input. This type of interaction may be relatively reliable, in that it does not rely only on the accuracy of the user's triggered movement, and may be relatively efficient, as the virtual item is propelled so that it is not required that the virtual contact is maintained from the moment of selection and the start of the movement until the virtual item reaches its target. The user may continue to sort and rearrange the items 251-259 in a similar manner, as in the example sequence shown in FIG. 2E, in which the item 258 is selected and thrown to a position corresponding to a target area 268, and in the example sequence shown in FIG. 2F, in which the item 254 is selected and thrown to a position corresponding to a target area 264. A target area or a target recipient may be considered to be intended if it is identified, for example based on the tracking as described above, as the target of the tracked movement.

In the examples shown in FIGS. 2A-2F, sorting by throwing of selected items is shown one item at a time, simply for ease of discussion and illustration. However, in some implementations, multiple items may be selected and thrown together, for sorting and/or sharing.

In some implementations, the sorting, rearrangement, stacking and the like of the items 251-259 shown in FIGS. 2A-2F may be applied to sorting or distributing the items into folders, bins and the like for sharing and/or storage and/or deleting/recycling and the like. When sharing items in this manner, the user B may, for example, access the item shared by user A from a shared folder or other shared location. Different types of items may be sorted in a similar manner.

Figure 3A:
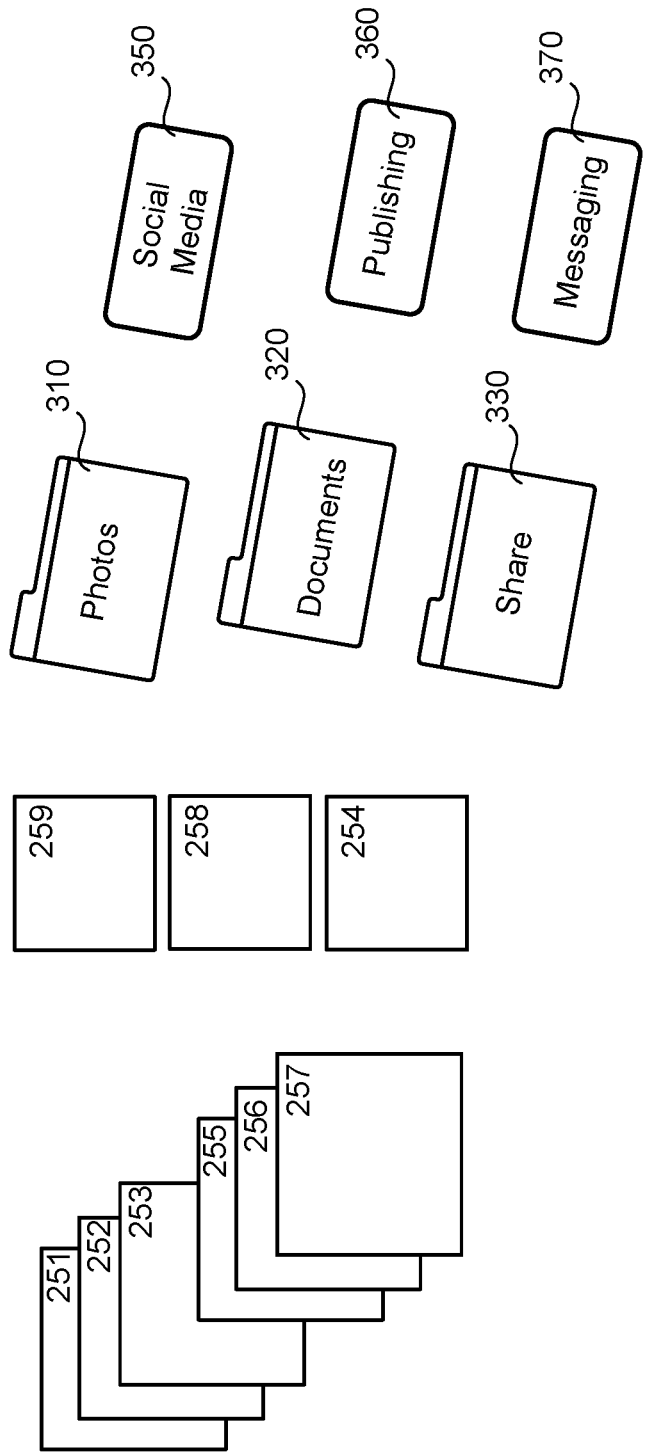

For example, the system may display to the user A the items 251-259 (for example, re-arranged as described above with respect to FIGS. 2A-2F, or in a different arrangement), and may also display one or more target recipients, or target areas, for receiving one or more of the items to be tossed or thrown by the user A as described above. The one or more target recipients, or target areas, may include, for example, a first bin or folder 310 for collecting a first set or type of items, such as, for example, photos, a second bin or folder 320 for collecting a second set or type of items, such as, for example, documents, a third bin or folder 330 for collecting a third set or type of items, such as, for example, items to be shared (for example, with the user B, or other user having access to the third bin or folder 330), and other bin(s) or folder(s) as appropriate for the particular user and environment. The one or more target recipients may also include, for example, destinations, or links to one or more websites such as, for example, a social media link or destination 340, a publishing link or destination 350, a messaging link or destination 360, and the like. The folders 31, 320 and 330, and the links 350, 360 and 370 shown in FIG. 3A are just examples of target recipients, or target areas, that may receive item(s) tossed or thrown by the user. Numerous other types and arrangements of target recipients, or target areas, may receive items(s) tossed or thrown by the user in the manner to be described below.

Figure 3B:
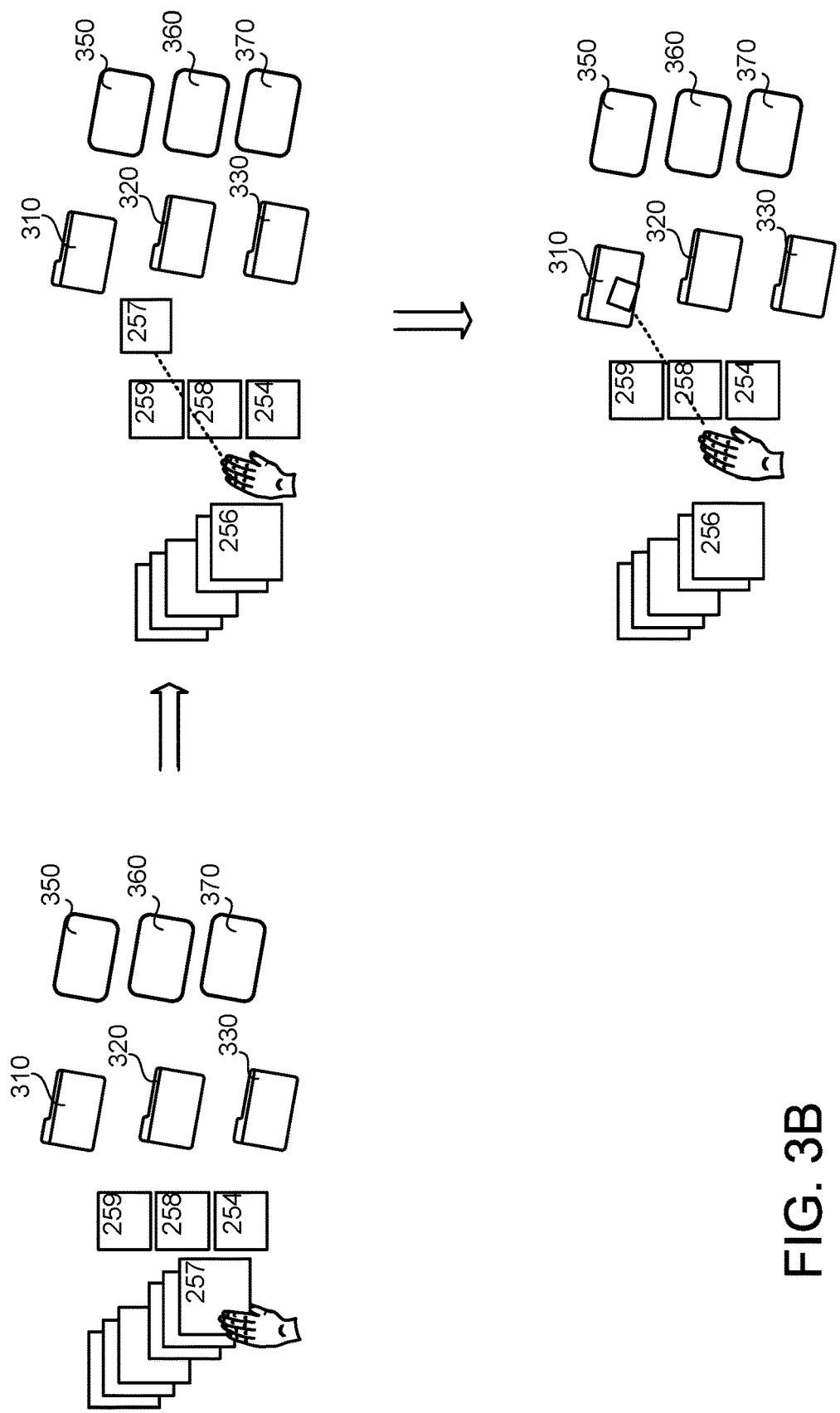

As shown in the sequence illustrated in FIG. 3B, the user may select item 257, and toss or throw the selected item 257 toward the first folder 310, for storage, or sharing, the first folder 310 being the intended target recipient of the selected item 257. In some implementations, the user may select the first folder 310 as the intended target recipient of the selected item 257 based on, for example, identification of a type or classification associated with the selected item 257, i.e., the user may determine that item 257 is a photo, and choose to direct item 257 into the first folder 310 with other photos. As the user implements the toss or throw of the selected item 257 in the direction of the first folder 310, the system may detect and track the movement of the user's hand, may translate that motion into a trajectory directed to the first folder 310, and may determine that the intended target recipient for the selected item 257 is the first folder 310 based on the detected trajectory.

In some implementations, the intended recipient of a tossed or thrown item may be determined based on certain associations between users, and/or attractive forces (for example, virtual forces that cause attraction in the virtual environment) associated with each of the possible target recipients with the item being thrown and/or the user throwing the item, in addition to, or instead of, the trajectory associated with the user's hand motion. A thrown item may be drawn to a particular target recipient based on characteristics associated with the item being thrown, and/or characteristics associated with the various possible target recipients. For example, a thrown item may be drawn to a particular target recipient based on association(s) between the user and the different target recipients, an association between the item being thrown and the different target recipients, a commonality between the item being thrown and the different target recipients, and other types of attractive forces associated with the user and/or the item being thrown and/or each of the different target recipients.

Figure 4A:
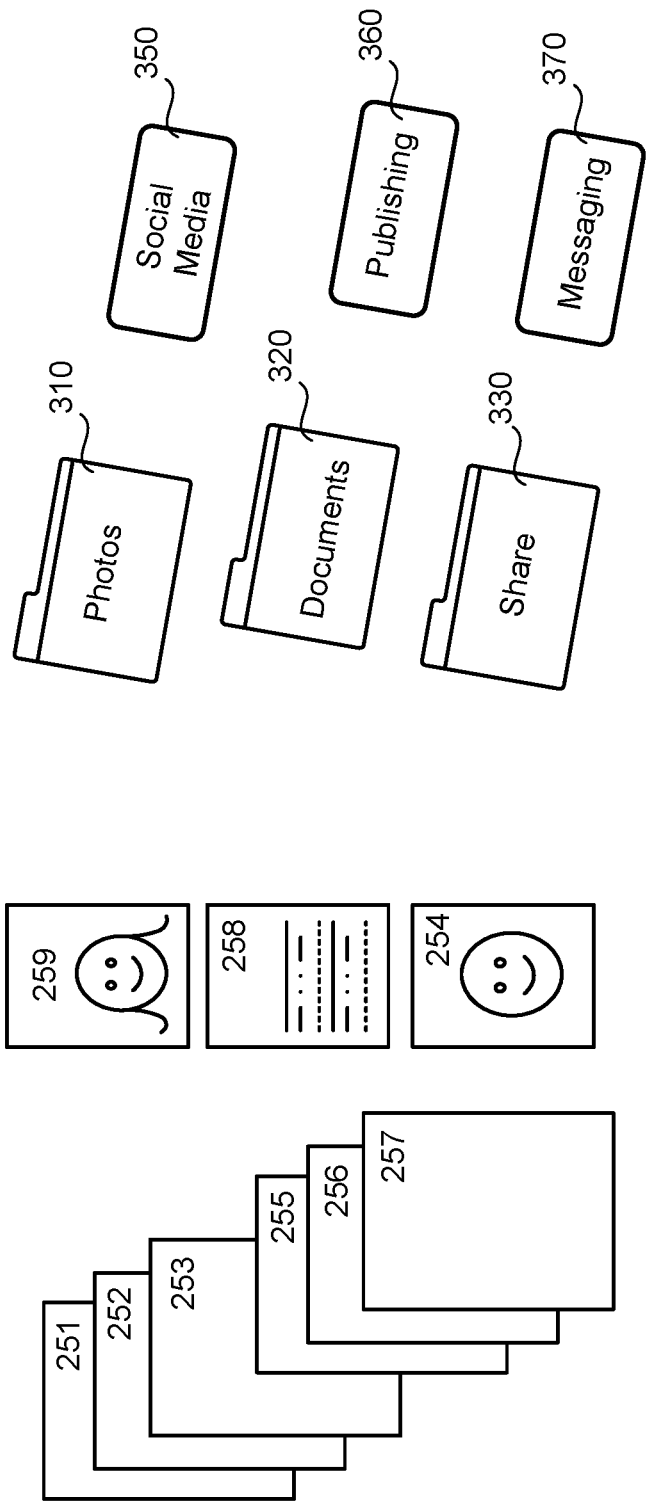
FIGS. 4A-4D and 5A-5C illustrate example implementations of item sharing and/or throwing to intended target recipients based on relative attraction forces, in accordance with implementations as described herein.

In the example shown in FIG. 4A, the items 251-259 and folders 310, 320 and 330 and links 350, 360 and 370 are displayed to the user by the system, for manipulation by the user as described above. In this example, the example items 254 and 259 are photos, and the example item 258 is a text document, simply for ease of illustration and explanation. Items to be displayed by the system for manipulation, sharing and the like by the user as described herein may include other types of items, such as, for example, email messages, text messages, web pages and links, video files, audio files, and other types of items.

Figure 4B:
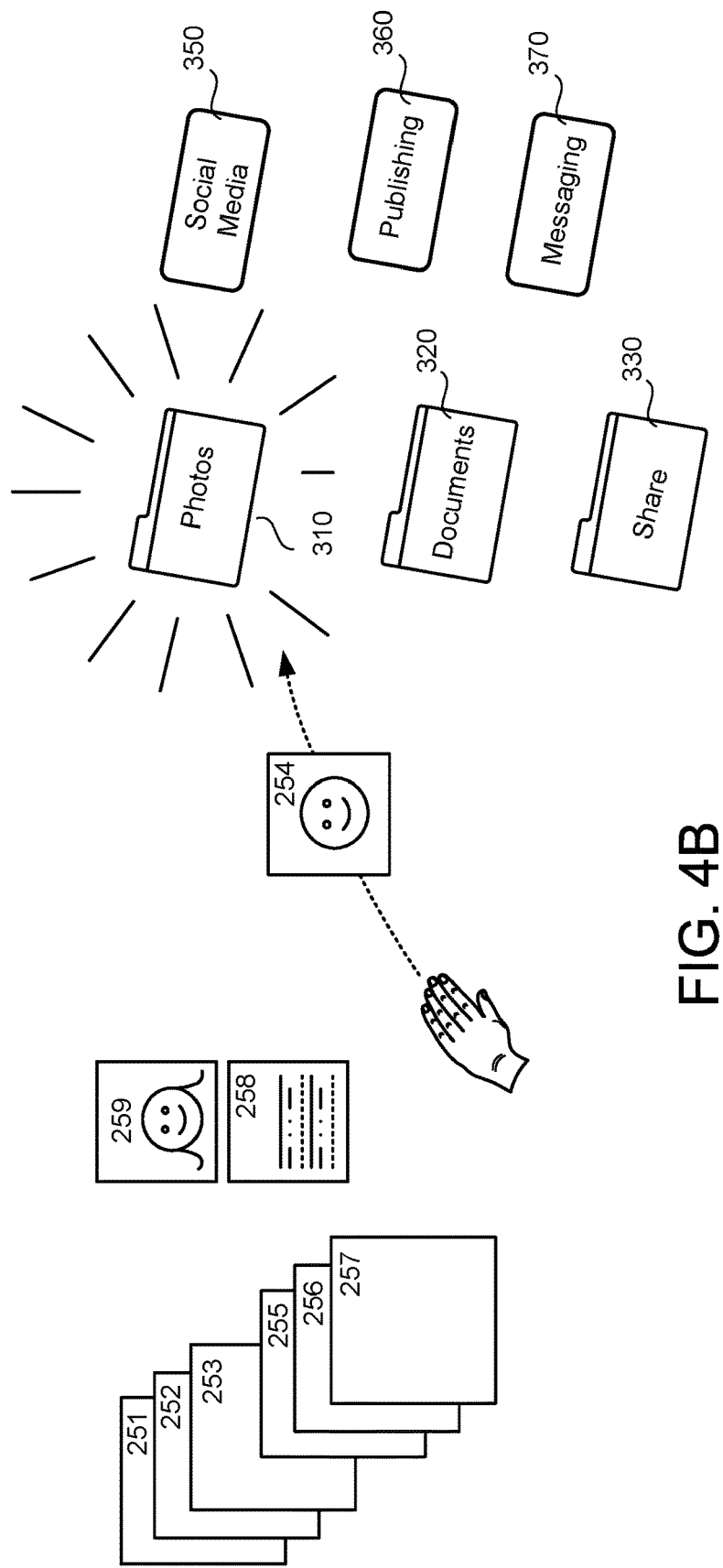

If the user selects item 254, as shown in FIG. 4B, the system may detect that the user has selected a photo (based on, for example, a file type associated with the item 254, tags associated with the item 254, and the like). In this example, the first folder 310 is designated for photos, the second folder 320 is designated for documents, and the third folder 330 is designated for items to be shared. Each of the folders 310, 320 and 330 may have an associated attractive force, or an associated level of magnetism, for particular types of items. For example, in response to detecting that the selected item 254 is a photo, the first folder 310 may exhibit a relatively high attractive force, or level of magnetism (for example, a virtual magnetism cause an attractive virtual force in the virtual environment), for the selected item 254, compared to the other folders 320 and 330, causing the item 254 to be drawn to the first folder 310 as the item is thrown in the direction of the folders 310, 320 and 330.

Figure 4C:
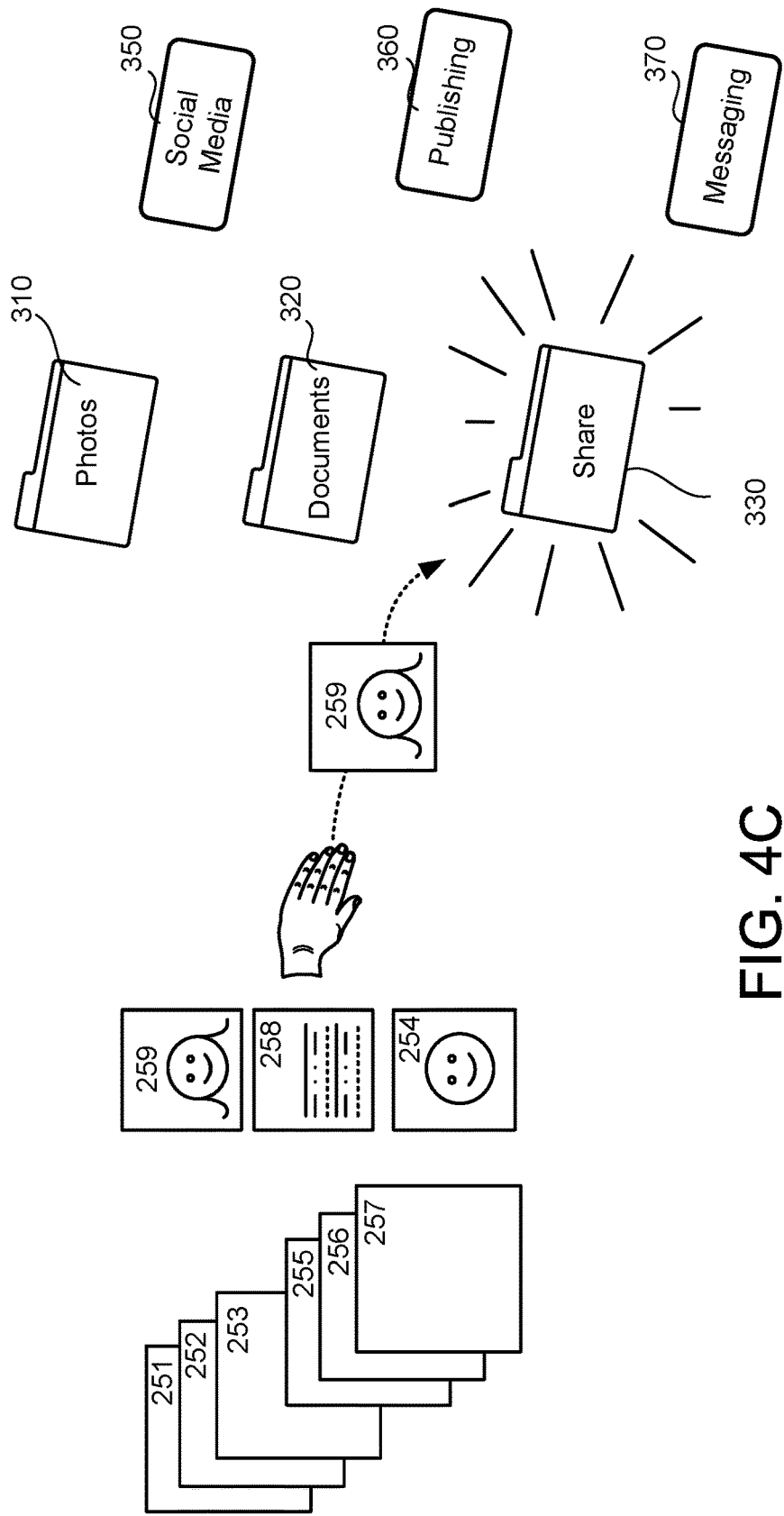

If the user, for example the user A, selects, for example, item 259, as shown in FIG. 4C, the system may again detect that the user has selected a photo. In this example implementation, in addition to the system detecting that the selected item 259 is a photo, the system may also detect a tag associated with the selected item 259, for example, a tag associated with the user B, and determine that the user A intends to share this photo with the user B. In this example, if, for example, the third folder 330 is a folder that is shared with the user B, then in response to detecting that the selected item 259 is a photo including a tag associating the selected item with the user B, the third folder 330 may exhibit a relatively high attractive force, or level of magnetism, for the selected item 259, compared to the other folders 310 and 320, causing the item 259 to be drawn to the third folder 330 as the item is thrown in the direction of the folders 310, 320 and 330 by the user A. The user B may then access the shared item 259 by accessing the folder 330.

Figure 4D:
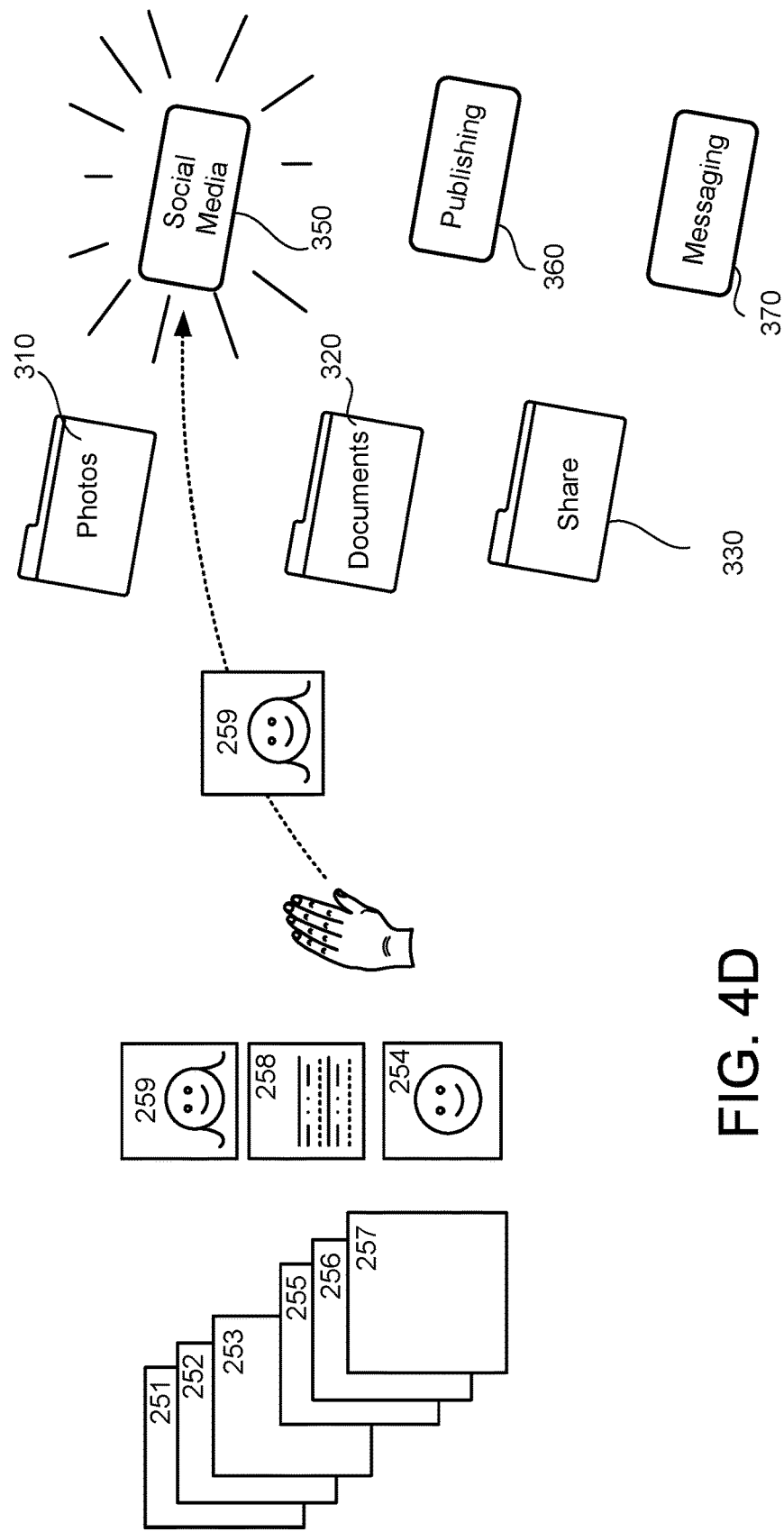

If the user, for example, the user A, selects, for example, the item 254, as shown in FIG. 4D, the system may again detect that the user has selected a photo. In this example, in addition to detecting that the selected item 254 is a photo, the system may also detect a tag associated with the selected item 254, for example, a social media tag, and determine that the user A intends to share this photo on a social media site. In this example, if, for example the detected social media tag corresponds to the social media link 350 available to the user A, associating the item 254 with the social media link 350, the social media link 350 may exhibit a relatively high attractive force, causing the item 254 to be drawn to the social media site for sharing, as shown in FIG. 4D.

While the selected items in the examples described above are photos, other types of items identified by/associated with another user may be drawn into, for example, the share folder 330 and/or to the social media site 350, in a similar manner. For example, other types of items, even items not specifically identified by/associated with another user, may be thrown into the share folder 330 by the user A, for sharing with other user(s). The share folder 330 may be designated for access by one other user (the user B, as in this example), or a group of other users, or for transfer to another location, and the like. Multiple share folders, for multiple different users, multiple different types of items and the like, may facilitate sharing.

In the examples shown in FIGS. 4A-4D, sorting by throwing of selected items into one of the folders 310/320/330 and/or sorting by throwing of selected items and directing the selected items to one of the websites via one of the links 350/360/370 is shown one item at a time, simply for ease of discussion and illustration. However, in some implementations, multiple items may be selected and thrown together, for sorting and/or sharing as described above.

Thus, items that are tossed or thrown by the user in the manner described above, toward an intended target recipient (for example, another user sharing the same virtual space, a folder, a bin, a shared site and the like), may be guided toward the intended target recipient not just by the projected trajectory extrapolated by the system based on the tracking of the movement of the user's hand as the user throws the item, but also based on various associations between the item selected and the possible target recipients. The various associations, based for example, on a type of item, pre-existing links between the user and the possible target recipients, requests for particular items from the possible target recipients and the like, may be governed by a set of previously defined rules. Application of these rules as an item is thrown towards a number of possible target recipients in the virtual environment may facilitate accurate delivery of the thrown item to the intended target recipient.

Figure 5A:
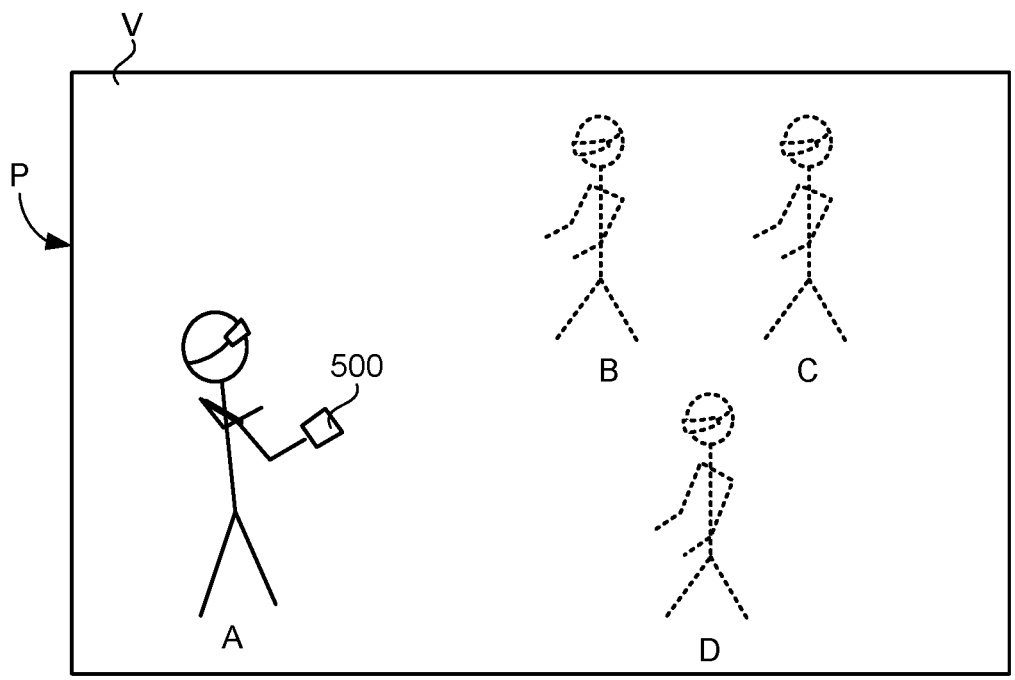
Figure 5B:
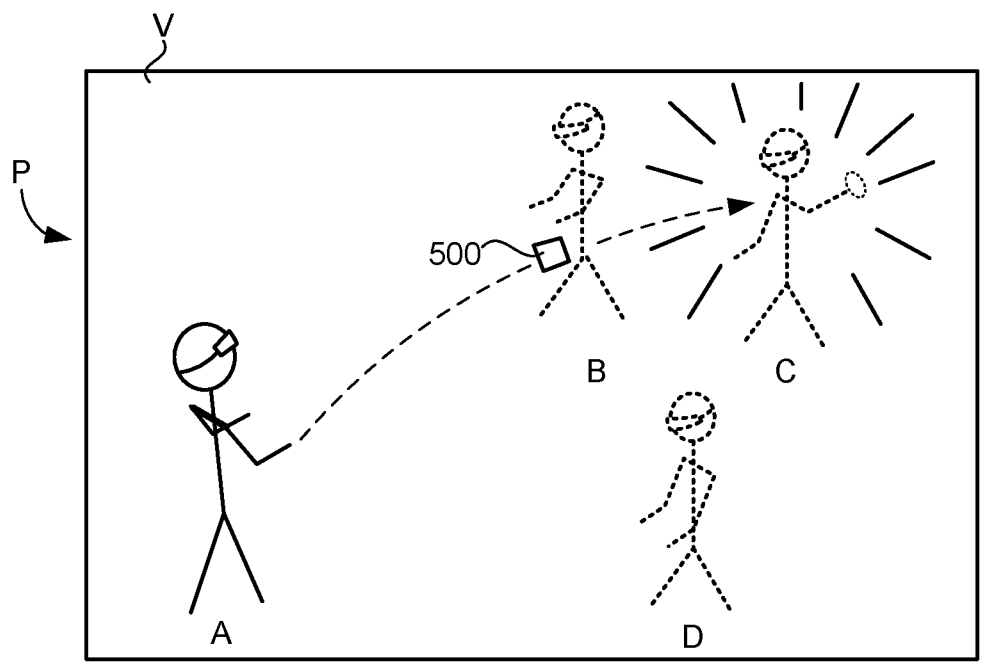
Figure 5C:
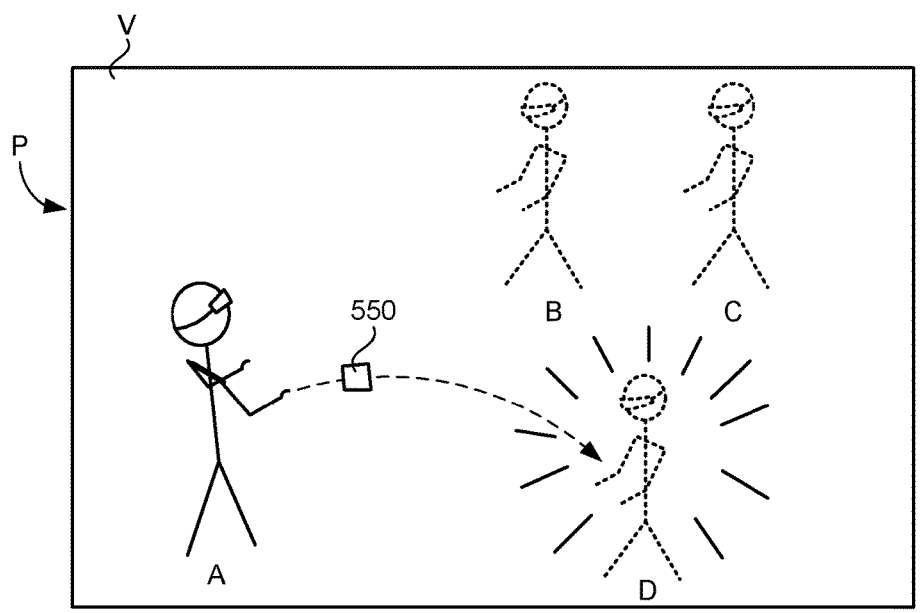

For example, as shown in FIGS. 5A-5C, multiple users A, B, C and D may be present in the same virtual environment V. User A may wish to share an item 500 with one of the other users B, C or D in the shared virtual environment V. In the example shown in FIGS. 5A-5C, the users B, C and D are displayed by the system in relatively close proximity to each other in the shared virtual environment V. This relatively close proximity of the possible target recipients (the users B, C and D) to each other may make it difficult for the item 500 to be accurately thrown by the user A to the intended target recipient. In this instance, the various associations, requests for particular items and the like, and the associated set of previously defined rules discussed above, may increase the likelihood, or probability, that the item 500 will be delivered to the intended target recipient, thus facilitating the accurate delivery of the item 500 thrown by the user A to the intended target recipient (i.e., one of the users B, C or D).

For example, the item 500 may be an email message generated by the user A in response to an email message originated by the user C. Thus, the item 500 may include an association between the user A and the user C. As the user A throws the item 500, the item 500 may be drawn to the user C, due to the association, or link, between the item 500 and the user C, and between the user A and the user C, as shown in FIG. 5B. In some implementations, the relatively high attractive force, or level of magnetism, exhibited by the user C for the item 500 in this example may cause the item 500 to be drawn to the user C, even when the extrapolated trajectory of the user's throw of the item 500 (based on the tracking of the movement of the hand of the user A) may cause some ambiguity in the intended recipient due to inaccuracy.

In another example, users A, B, C and D may share the same virtual environment V, and a link or association may exist between some, but not all, of the users in the same virtual environment V. For example, a link or association may exist between the user A and the user D, but not between the user A and the user B, nor between the user A and the user C. This link or association between the user A and the user D may be established based on, for example, registration in the same session of a virtual experience, confirmation of previously exchanged contact information, other link or association in an application, and the like. As shown in FIG. 5C, the user A may wish to share an item 550 with the user D, but not necessarily with the user B or the user C. Thus, the item 550 may remain private, or concealed from, the user B and the user C as the user A shares the item 550 with the user D by tossing or throwing the item 550 to the user D. The relatively high attractive force, or level of magnetism, exhibited by the user D for the item 550, coming from the user A due to the established link or association between the user A and the user D, may cause the item 550 to be drawn to the user D, even when the extrapolated trajectory of the user A's throw of the item 550 (based on the tracking of the movement of the user A's hand) may have otherwise caused some ambiguity in determining the intended recipient due to inaccuracy in the throw, relative movement of the user A and the user D, and the like. In some implementations, the lack of an existing association or link between the user A and the users B and C may preclude the item 550 from being intercepted by the user B or the user C.

In the examples shown in FIGS. 5A-5C, sharing by throwing of selected items is shown one item at a time, simply for ease of discussion and illustration. However, in some implementations, multiple items may be selected and thrown together, for sorting and/or sharing with other users.

Figure 6A:
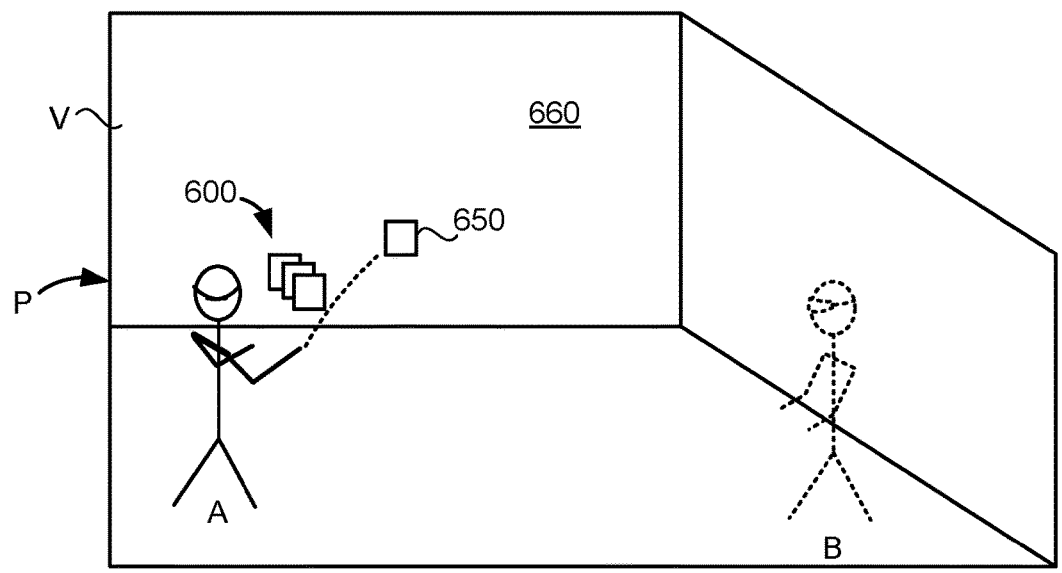
FIGS. 6A-6E illustrate example implementations of item sharing and/or throwing for intelligent sizing and/or placement in an augmented and/or virtual reality system, in accordance with implementations as described herein.

In some implementations, a set of previously defined rules may be applied to an item that is tossed or thrown by the user, not just to facilitate the determination of the intended target recipient, but also to adjust a display of the item upon receipt of the item by the intended target recipient. For example, metadata associated with the item(s) may be taken into consideration when determining an intended target recipient for the item that is tossed or thrown or otherwise propelled by the user, the metadata remaining associated with the item after the movement of the item in this manner, and the metadata possibly affecting or otherwise triggering other action upon receipt of the item by the intended target recipient. For example, a user may wish to have the system display a selected item in a different manner in the virtual environment V, for further manipulation by the user, and/or for sharing with another user. The user A may select an item 650, for example, from a group 600 of items, and may toss or throw the selected item 650 toward a display surface 660, as shown in FIG. 6A. In the example shown in FIG. 6A, the display surface 660 is a wall in the virtual environment V, the display surface 660 defining the intended target recipient for the selected item 650.

The selected item 650 may be drawn to the display surface 660 based not only on the detected movement of the user's hand and associated trajectory, but also due to an attractive force, or level of magnetism, associated with the display surface 660 causing the item to be drawn to the display surface 660. The attractive force, or magnetism, of a particular display surface 660 may be defined by characteristics such as, for example, an available virtual display area available at the display surface 660, an orientation of the display surface 660, a surface texture of the display surface 660, and the like, compared to characteristics of the selected item 650 to be displayed on the display surface 660.

Figure 6B:
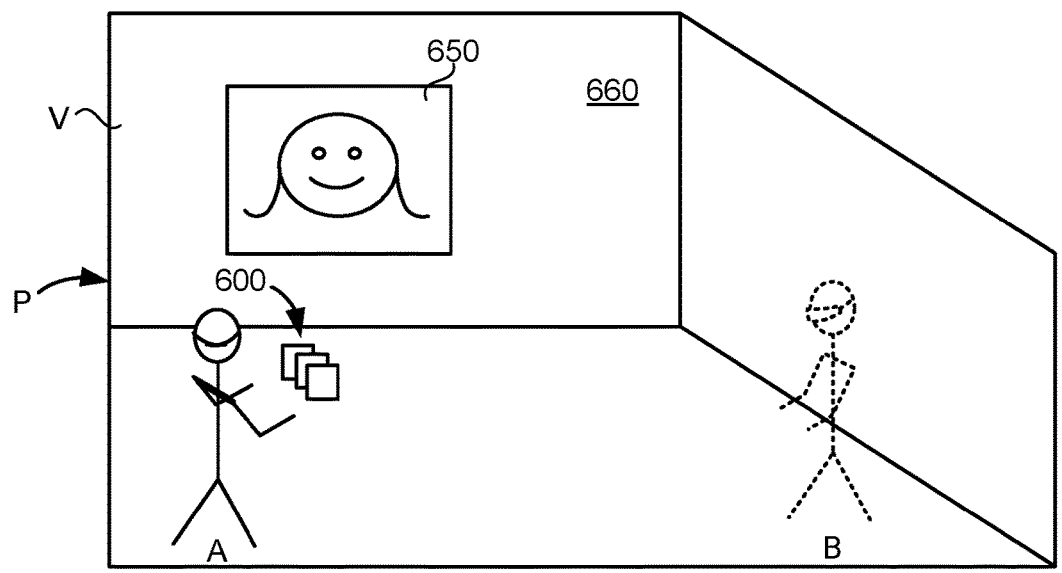

In some implementations, upon arriving at the display surface 660, an appearance of the selected item 650 may be changed or adjusted by the system, based on the pre-set rules associated with the display surface 660 as the target recipient. For example, as shown in FIG. 6B, upon arriving at the display surface 660, the selected item 650 may be enlarged based on a size of the display surface 660 for further manipulation by the user A, and/or for sharing with and/or further manipulation by the user B.

Figure 6C:
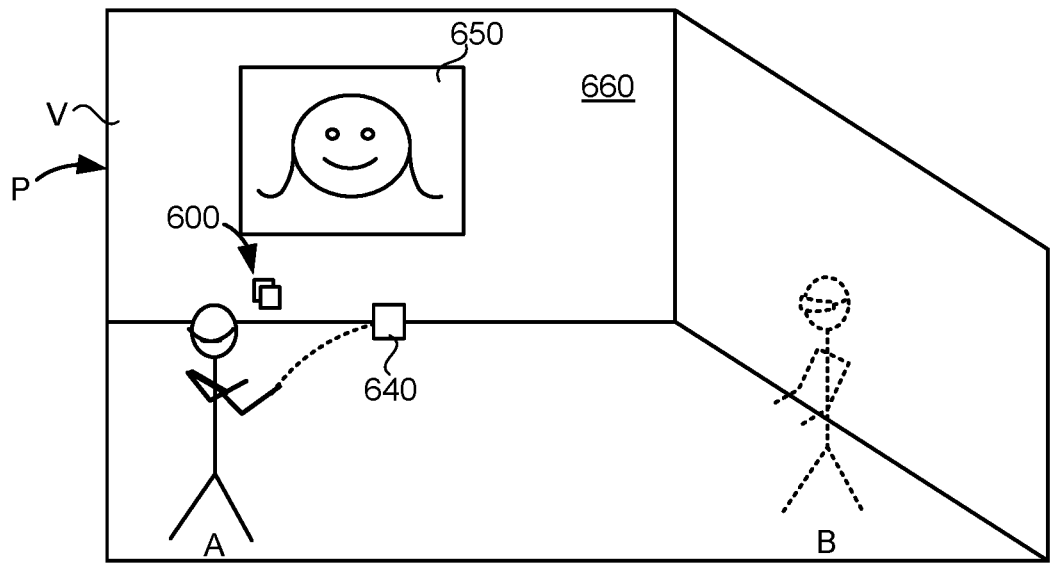
Figure 6D:
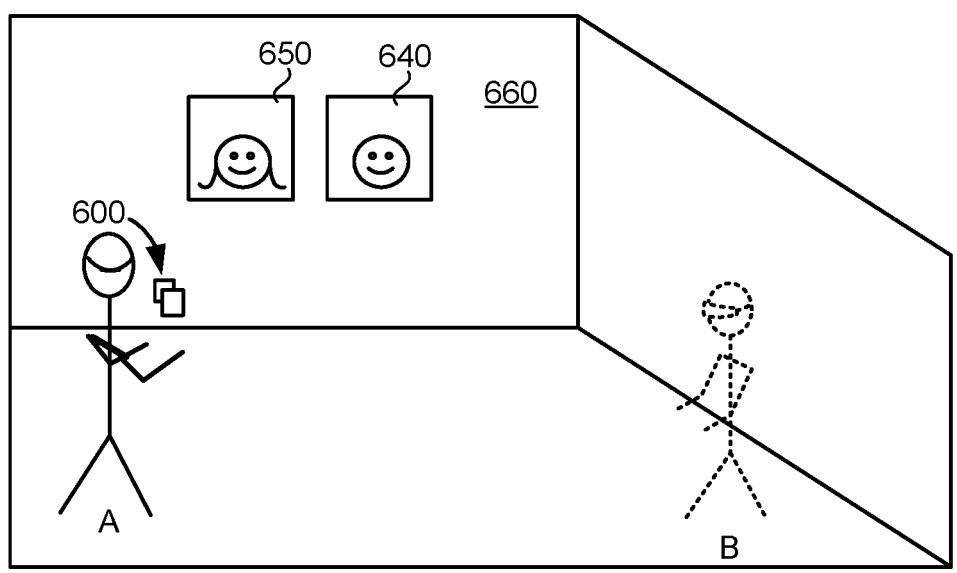
Figure 6E:
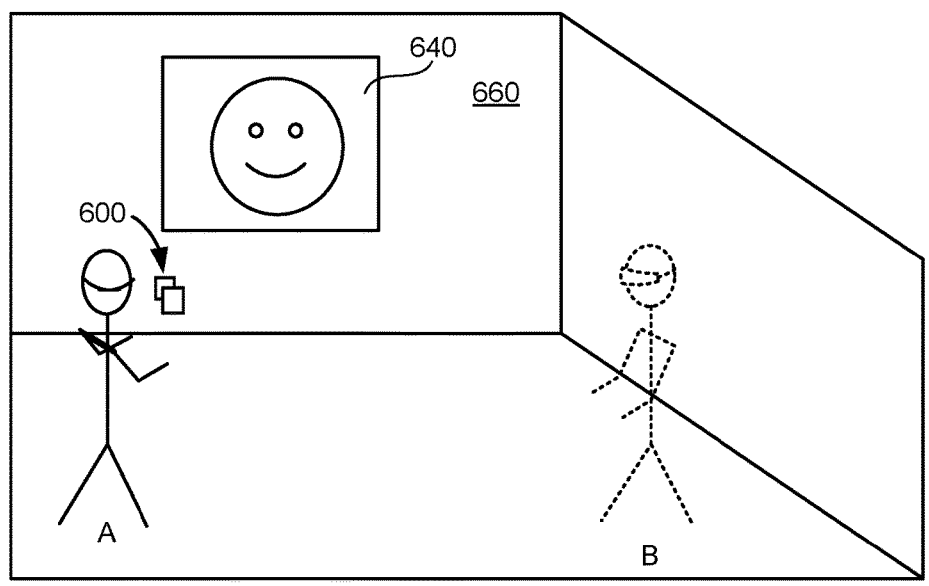

In some implementations, the user A may then select another item 640 from the group 600 of items, and may toss or throw the selected item 640 toward the display surface 660 for display of the item 640 together with the item 650, as shown in FIG. 6C. In some implementations, upon arriving at the display surface 660, an appearance of the selected item 640, as well as an appearance of the selected item 650, may be changed or adjusted by the system, based on the pre-set rules associated with the display surface 660 as the target recipient. For example, as shown in FIG. 6D, upon arriving at the display surface 660, a size of the selected item 640 may be enlarged, and a size of the previously displayed item 650 may be adjusted to accommodate the display of the selected item 640, based on pre-set rules associated with the display surface 660. In some implementations, the previously displayed item 650 may be replaced by the newly selected item 650 upon arrival of the newly selected item 650 at the display surface 660, as shown in FIG. 6E.

As shown in FIGS. 6A-6E, item(s) may be drawn to a particular display surface, and/or characteristic(s) of items thrown by the user in the virtual space may be adjusted upon arrival at the display surface, based on pre-set rules associated with the display surface and the item being thrown. The example implementation shown in FIGS. 6A-6E illustrates the display of photos on a vertical surface in the virtual space V. However, other types of items such as documents and the like may also be displayed and adjusted in this manner. Further, items may be displayed, manipulated and the like on other display surfaces such as, for example, horizontally oriented desk or table top surfaces in the virtual space V, within virtual frames or windows displayed in the virtual space, and the like.

In the example discussed above with respect to FIGS. 6A-6E, the example display surface 660 is a wall in the virtual environment V, with the display surface 660 defining the intended target recipient for the selected item(s) 640 and 650. However, in some implementations, particularly when operating in, for example, an augmented reality environment, the target recipient for the selected item may be, for example, another device, such as, for example another computing device, a television, or other type of display device. In this situation, a selected item to be shared, for example, by throwing as described above, may be intelligently sized and placed at this type of electronic display device, defining the target recipient of the item to be shared. In some implementations, sharing of an item in this manner, with an electronic display device, may cause further action to be executed upon sharing the item with the electronic display device. For example, sharing in this manner may cause an audio file and/or a video file to be automatically played upon sharing, by throwing, of this type of file to an electronic display device. Sharing, for example, an email message or a text message in this manner may cause the shared item to be displayed and an email application, or a messaging application to be launched. The sharing of other types of items in this manner may cause subsequent action to be executed at the receiving device.

In some implementations, this system may be implemented to exchange or share items such as gifts purchased by a first user from a virtual store and shared or transmitted to a second user, or event tickets purchased by a first user and shared or transmitted to a second user so that the user can experience the event with the first user.

Figure 7A:
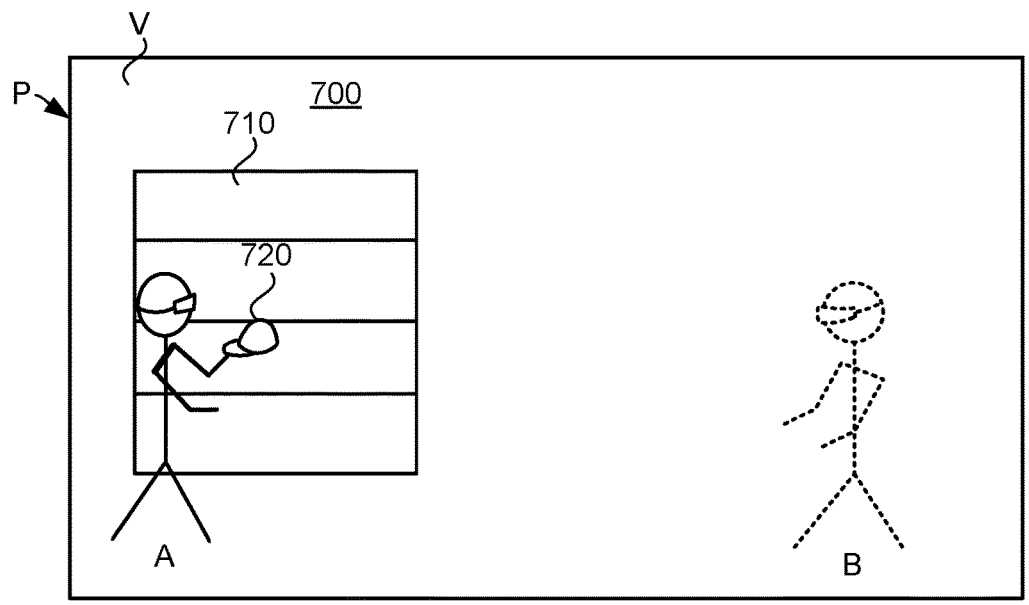
FIGS. 7A-7B and 8A-8B illustrate example implementations of item sharing and/or throwing in an augmented and/or virtual reality shopping environment, in accordance with implementations as described herein.
Figure 7B:
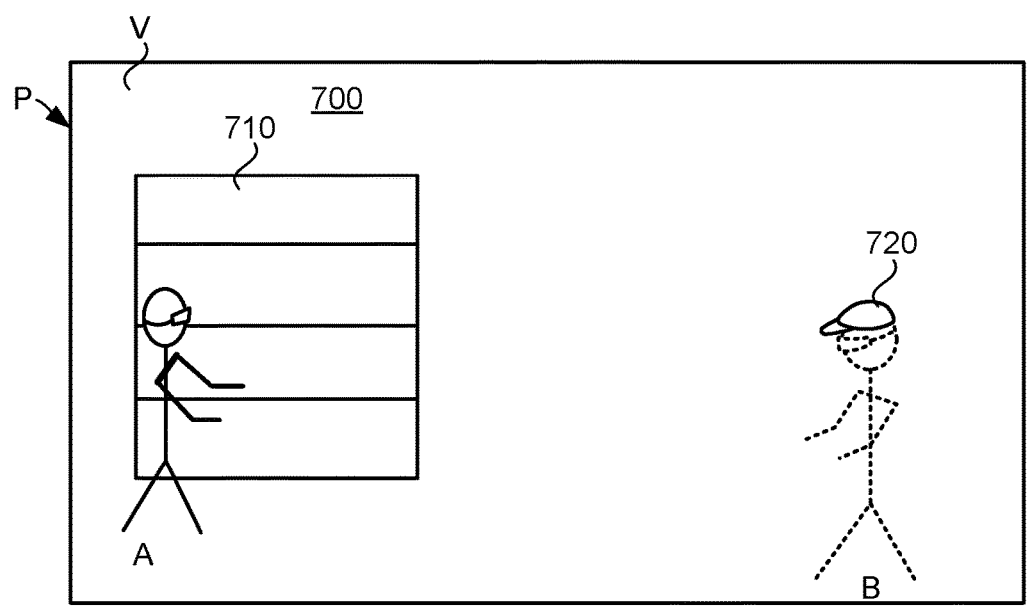

As shown in the example illustrated in FIG. 7A, the user A may select a virtual item 720, for example, a virtual cap, from a virtual display 710 in a virtual store 700 generated by the system, and may toss or throw the selected item 720 to the user B to share the selected item 720 with the user B. Upon reaching the user B (the intended target recipient), the selected item 720 (the cap 720 in this example), may be presented to the user B in a number of different forms. For example, in some implementations, the user B may receive a notification that the user A has purchased the selected item for the user B, with associated purchase and delivery information. In some implementations, the user B may receive information from the user A related to the item 720, indicating that the user A may be interested in the item 720, and provide information on how to proceed with purchase of the item 720. In some implementations, the item 720 may be located in a use position relative to the user B, so that the user may make an assessment of the item, for example, for potential purchase. For example, as a result of the throw from the user A, the virtual cap 720 may be positioned on the user B's head, so that the user B, allowing the user to try the item on. Various other scenarios may also apply, in which the user A selects an item from the virtual store 700 and tosses or throws the selected item to the user B for consideration by the user B, or as a gift to the user B, or for further action by the user B, and the like.

Figure 8A:
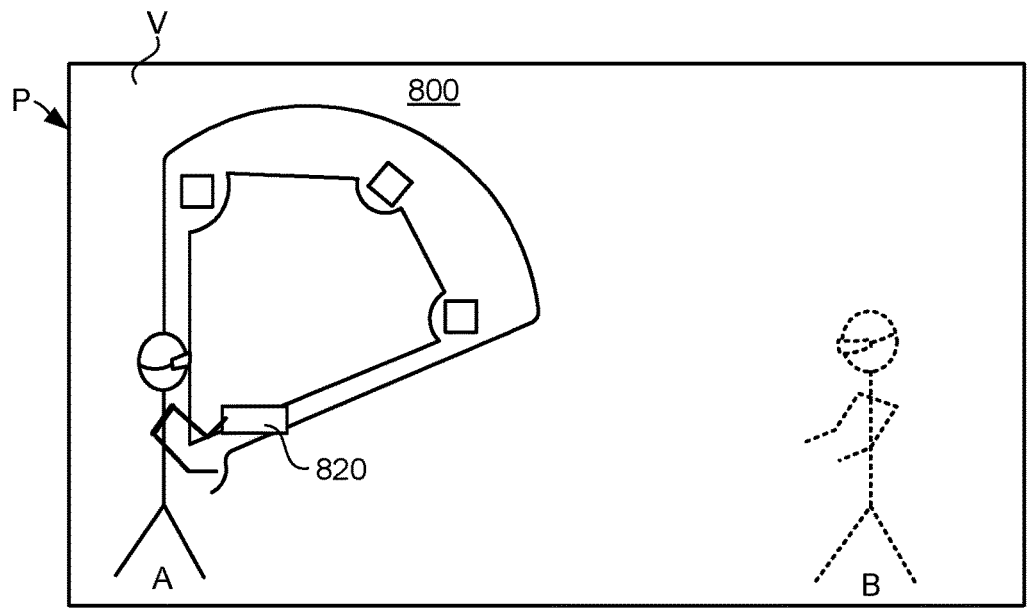
Figure 8B:
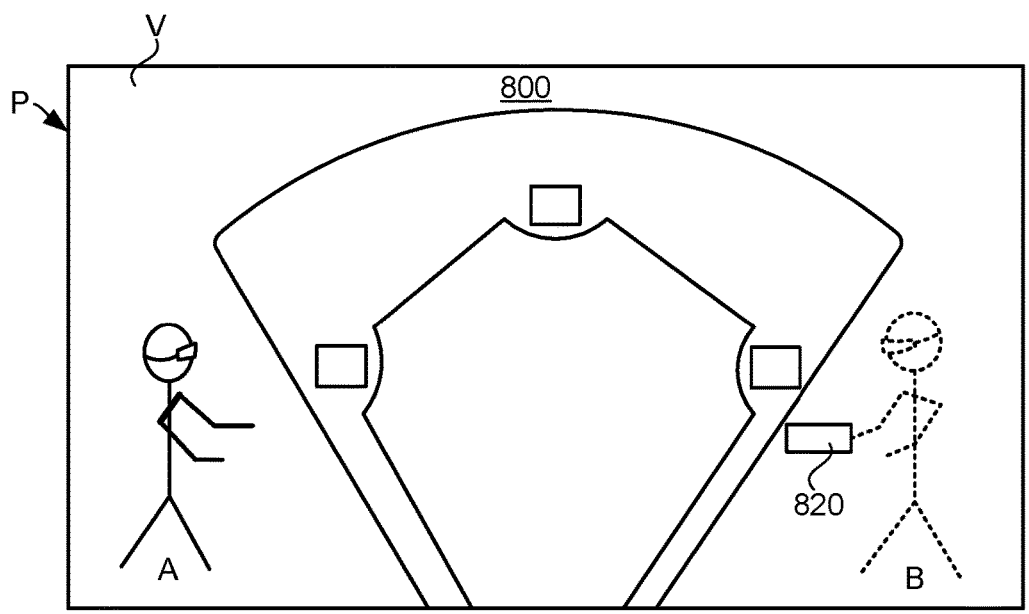

As shown in FIG. 8A, the user A may be immersed in an event 800 displayed by the system, such as, for example, a baseball game as shown in the example illustrated in FIG. 8A, or other event. In the situation shown in FIG. 8A, user B has not gained, or purchased, access to the event 800 and thus cannot view the event 800 as user A is able to view the event 800. The user A may obtain access, such as purchase a ticket 820, for the user B, and toss or throw the ticket to the user B. Upon reaching the user B (the intended target recipient), the user B may be immersed in the event 800 with the user A, as shown in FIG. 8B.

Figure 9:
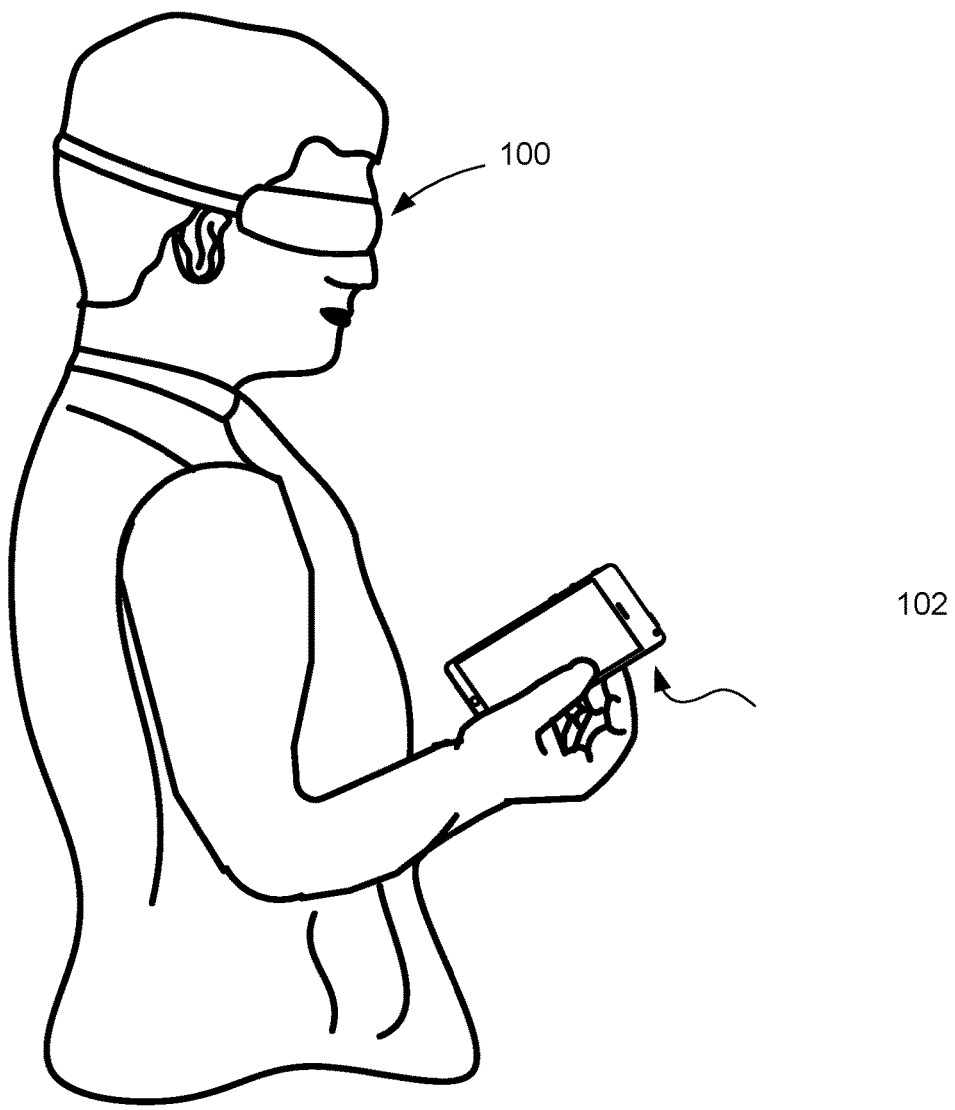
FIG. 9 illustrates an augmented reality and/or virtual reality system including a head mounted display device and a controller, in accordance with implementations as described herein.

As noted above, the augmented reality environment and/or virtual reality environment may be generated by a system including, for example, an HMD 100 worn by a user, as shown in FIG. 9. As discussed above, the HMD 100 may be controlled by various different types of user inputs, and the user may interact with the augmented reality and/or virtual reality environment generated by the HIVID 100 through various different types of user inputs, including, for example, hand/arm gestures including tossing or throwing gestures as described in detail above, head gestures, manipulation of the HIVID 100, manipulation of a portable controller 102 operably coupled to the HIVID 100, and the like.

Figure 10A:
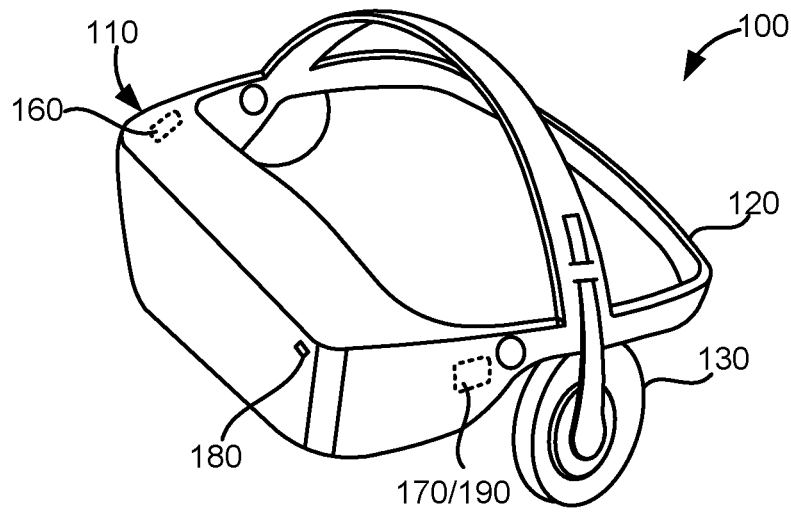
FIGS. 10A and 10B are perspective views of an example head mounted display device, in accordance with implementations as described herein.
Figure 10B:
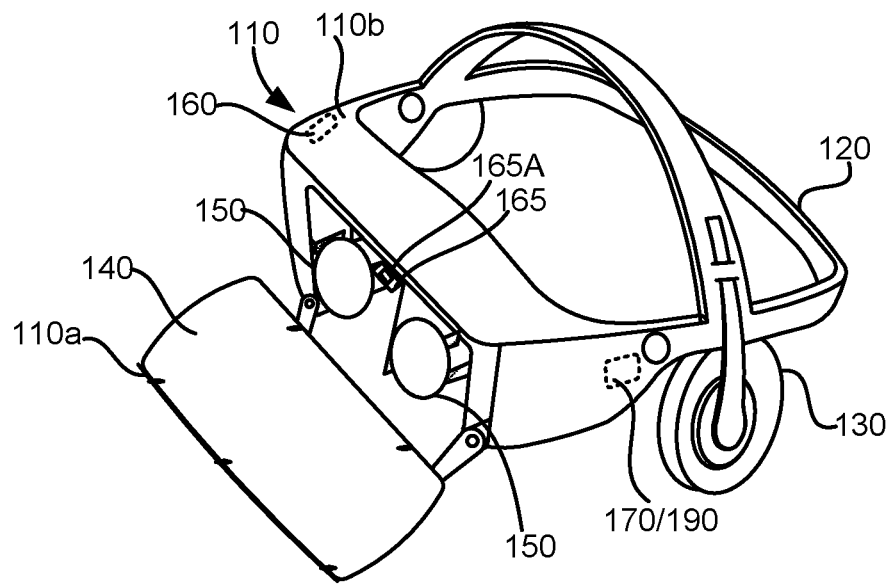
Figure 11:
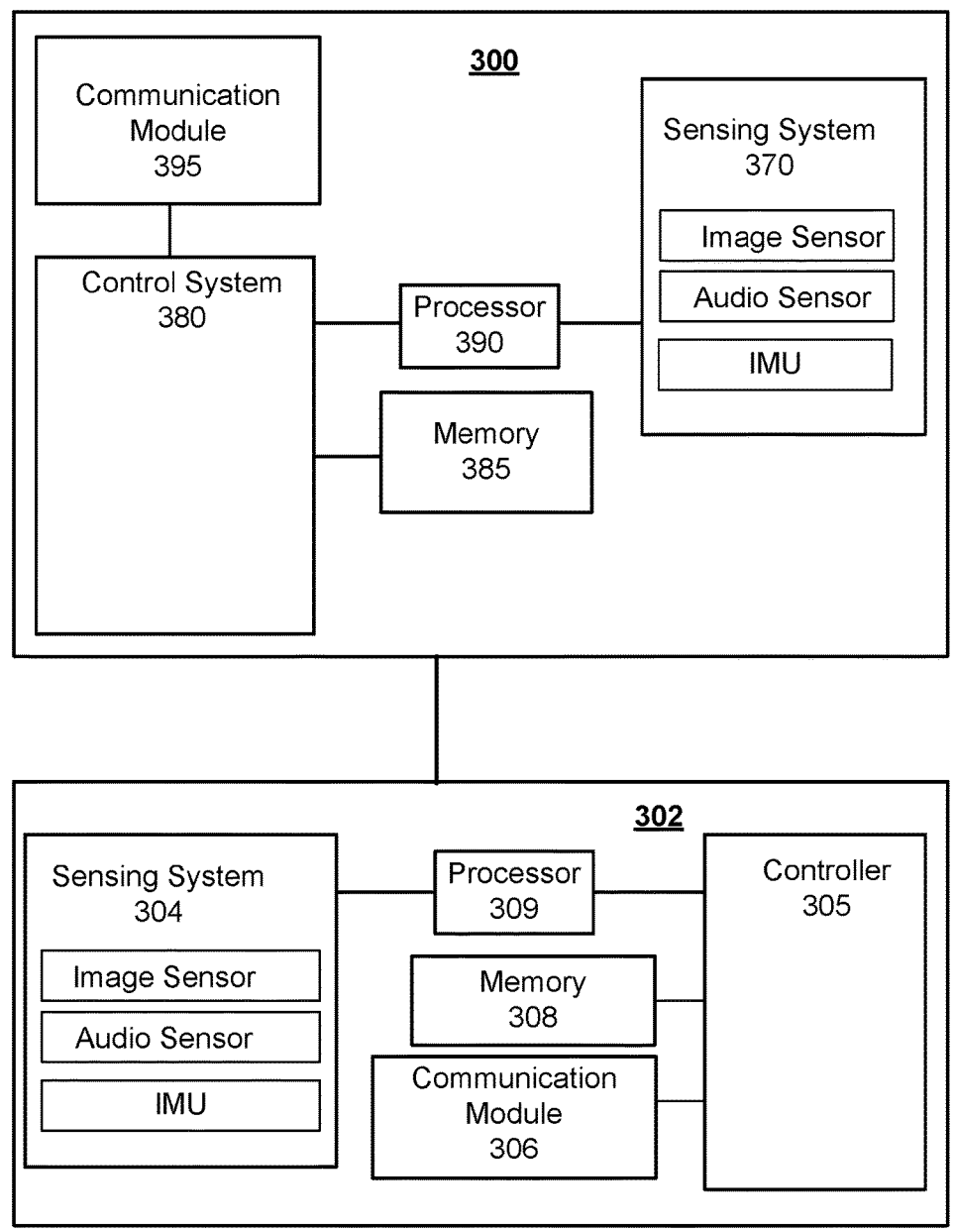
FIG. 11 is a block diagram of a head mounted electronic device and a controller, in accordance with implementations as described herein.

FIGS. 10A and 10B are perspective views of an example HIVID, such as, for example, the HIVID 100 worn by the user in FIG. 9. FIG. 11 is a block diagram of an augmented reality and/or virtual reality system including a first electronic device in communication with a second electronic device. The first electronic device 300 may be, for example an HIVID generating an augmented and/or virtual reality environment, and the second electronic device 302 may be, for example, a controller as shown in FIG. 4.

As shown in FIGS. 10A and 10B, the example HIVID may include a housing 110 coupled to a frame 120, with an audio output device 130 including, for example, speakers mounted in headphones, coupled to the frame 120. In FIG. 10B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HIVID 100 may include a sensing system 160 including various sensors such as, for example, audio sensor(s), image/light sensor(s), positional sensors (e.g., inertial measurement unit including gyroscope and accelerometer), and the like. The HIVID 100 may also include a control system 170 including a processor 190 and various control system devices to facilitate operation of the HMD 100.

In some implementations, the HIVID 100 may include a camera 180 to capture still and moving images. The images captured by the camera 180 may be used to help track a physical position of the user and/or the controller 102, and/or may be displayed to the user on the display 140 in a pass through mode. In some implementations, the HIVID 100 may include a gaze tracking device 165 including one or more image sensors 165A to detect and track an eye gaze of the user. In some implementations, the HIVID 100 may be configured so that the detected gaze is processed as a user input to be translated into a corresponding interaction in the augmented reality and/or virtual reality environment.

As shown in FIG. 11, the first electronic device 300 may include a sensing system 370 and a control system 380, which may be similar to the sensing system 160 and the control system 170, respectively, shown in FIGS. 10A and 10B. The sensing system 370 may include, for example, a light sensor, an audio sensor, an image sensor, a distance/proximity sensor, a positional sensor, and/or other sensors and/or different combination(s) of sensors, including, for example, an image sensor positioned to detect and track the user's eye gaze, such as the gaze tracking device 165 shown in FIG. 5B. The control system 380 may include, for example, a power/pause control device, audio and video control devices, an optical control device, a transition control device, and/or other such devices and/or different combination(s) of devices. The sensing system 370 and/or the control system 380 may include more, or fewer, devices, depending on a particular implementation, and may have a different physical arrangement that shown. The first electronic device 300 may also include a processor 390 in communication with the sensing system 370 and the control system 380, a memory 385, and a communication module 395 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300. The second electronic device 302 may include a sensing system 304 including an image sensor and an audio sensor, such as is included in, for example, a camera and microphone, an inertial measurement unit, a touch sensor such as is included in a touch sensitive surface of a controller, or smartphone, and other such sensors and/or different combination(s) of sensors. A processor 309 may be in communication with the sensing system 304 and a control unit 305 of the second electronic device 302, the control unit 305 having access to a memory 308 and controlling overall operation of the second electronic device 302.

Figure 12:
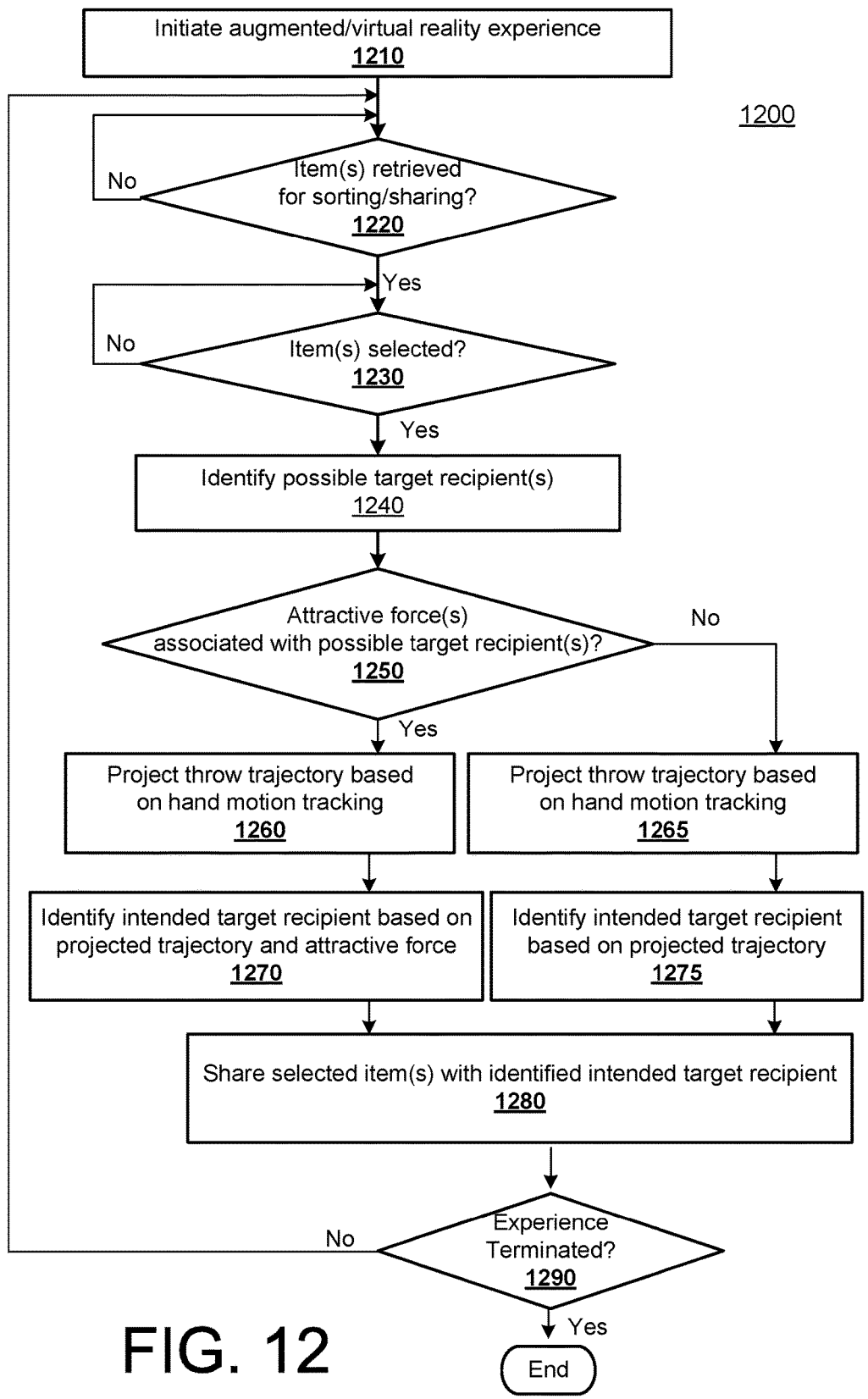
FIG. 12 is a flowchart of a method of sharing an item by throwing in an augmented reality system and/or a virtual reality system, in accordance with implementations as described herein.

A method 1200 of sharing an item by throwing in an augmented reality environment and/or a virtual reality environment, in accordance with implementations described herein, is shown in FIG. 12.

A user may initiate an augmented reality experience and/or a virtual reality experience using, for example, a computing device such as, for example, a system including a head mounted display device as described above with respect to FIGS. 9-11, to generate the augmented reality and/or virtual reality environment (block 1210). The user may retrieve one or more items for sorting or sharing by throwing (block 1220). When it is detected that one (or more) of the retrieved item(s) has been selected for sorting or sharing by throwing, for example, as described above with respect to FIGS. 2A-2F, (block 1230), the system may detect possible target recipients for the selected item(s), for example, as described above with respect to FIGS. 4A-8B (block 1240). The system may then detect whether or not attractive forces are associated with the identified possible target recipients, for example, as described above with respect to FIGS. 4A-5C (block 1250).

If attractive forces are associated with one or more of the identified possible target recipients (block 1250), the system may identify the intended target recipient for the thrown item(s) (block 1270) based on a projected throw trajectory determined based on a six degree of freedom tracking of the user's hand as the item is thrown in the virtual environment, for example, as described above with respect to FIGS. 1A-8B, together with a comparison of the attractive force(s) associated with the possible target recipients. If it is determined that attractive forces are not associated with one or more of the identified possible target recipients (block 1250), the system may identify the intended target recipient for the thrown item(s) (block 1275) based on a projected throw trajectory. The projected throw trajectory may be determined based on the six degree of freedom tracking of the user's hand as the item is thrown in the virtual environment, for example, as described above with respect to FIGS. 1A-8B (block 1265). The selected item(s) may then be shared with the intended target recipient (as identified at block 1270 or block 1275) (block 1280).

The process may continue until it is determined that the current augmented reality and/or virtual reality experience has been terminated (block 1290).

Figure 13:
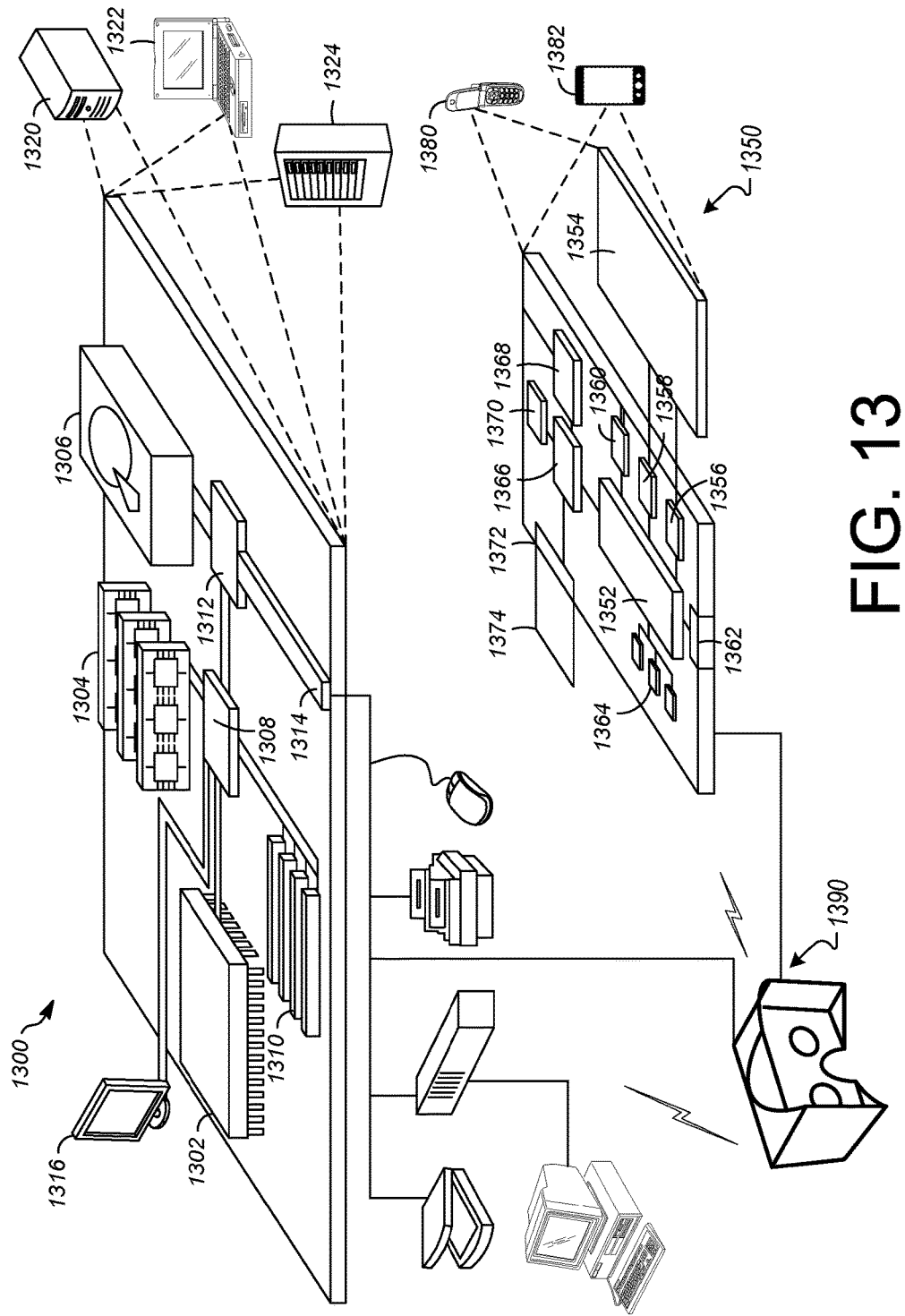
FIG. 13 shows an example of a computer device and a mobile computer device that can be used to implement the techniques described herein.

FIG. 13 shows an example of a computer device 1300 and a mobile computer device 1350, which may be used with the techniques described here. Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, Wi-Fi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 13 can include sensors that interface with a virtual reality (VR headset/HMD device 1390). For example, one or more sensors included on a computing device 1350 or other computing device depicted in FIG. 13, can provide input to VR headset 1390 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1350 can use the sensors to determine an absolute position and/or a detected rotation of the computing device in the VR space that can then be used as input to the VR space. For example, the computing device 1350 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1350 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1350 when the computing device is incorporated into the VR space can cause a particular action to occur in the VR space.

In some implementations, a touchscreen of the computing device 1350 can be rendered as a touchpad in VR space. A user can interact with the touchscreen of the computing device 1350. The interactions are rendered, in VR headset 1390 for example, as movements on the rendered touchpad in the VR space. The rendered movements can control virtual objects in the VR space.

In some implementations, one or more output devices included on the computing device 1350 can provide output and/or feedback to a user of the VR headset 1390 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1350 may appear as another object in a computer-generated, 3D environment. Interactions by the user with the computing device 1350 (e.g., rotating, shaking, touching a touchscreen, swiping a finger across a touch screen) can be interpreted as interactions with the object in the VR space. In the example of the laser pointer in a VR space, the computing device 1350 appears as a virtual laser pointer in the computer-generated, 3D environment. As the user manipulates the computing device 1350, the user in the VR space sees movement of the laser pointer. The user receives feedback from interactions with the computing device 1350 in the VR environment on the computing device 1350 or on the VR headset 1390.

In some implementations, a computing device 1350 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1300 is intended to represent various forms of digital computers and devices, including, but not limited to laptops, desktops, workstations, personal digital assistants, servers, blade servers, mainframes, and other appropriate computers. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claimed.

What is claimed is:

1. A computer-implemented method, comprising:
   generating, by a computing device operating in an ambient environment, a virtual environment;
   receiving, by a processor of the computing device, a selection of a virtual item by a selection device in virtual contact with the selected virtual item, the selected virtual item representing content associated with the selected virtual item;

tracking movement of the selection device in virtual contact with the selected virtual item;

projecting a virtual trajectory for propulsion of the selected virtual item based on the tracked movement of the selection device in virtual contact with the selected virtual item;

identifying a target recipient for the selected virtual item, including:

detecting a plurality of possible recipients in the virtual environment, the plurality of possible recipients respectively corresponding to a plurality of virtual representations in the virtual environment;

detecting an attractive force associated with each of the plurality of possible recipients, wherein the attractive force is based on a commonality between a characteristic of the content of the selected virtual item and a characteristic of each of the plurality of possible recipients; and identifying the target recipient based on the projected virtual trajectory for the propulsion of the selected virtual item and the detected attractive force associated with each of the plurality of possible recipients; and sharing the content of the selected virtual item with the identified target recipient.

2. The method of claim 1, detecting the attractive force associated with each of the plurality of possible recipients including detecting at least one of:

an existing association with one or more of the plurality of possible recipients;

an existing share request from one or more of the plurality of possible recipients;

a sharing history with one or more of the plurality of possible recipients; or a common format type with one or more of the plurality of possible recipients.

3. The method of claim 1, tracking movement of the selection device in virtual contact with the selected virtual item including:

tracking a six degree of freedom movement of a hand of a user through a throwing movement of the hand of the user;

projecting the virtual trajectory for the selected virtual item based on the tracked throwing movement of the hand of the user; and identifying the intended target recipient based on an extension of the projected virtual trajectory to one of a plurality of possible recipients in the virtual environment.

4. The method of claim 1, wherein identifying the target recipient from the plurality of possible recipients in the virtual environment includes identifying the target recipient from a plurality of additional users sharing the virtual environment; and detecting the attractive force associated with each of the plurality of possible recipients in the virtual environment includes detecting the attractive force associated with each possible recipient based on at least one of:

an established association between the user and the possible recipient; or a request for sharing of the content of the virtual item by the possible recipient.

5. The method of claim 1, wherein identifying the target recipient includes identifying the target recipient from a plurality of virtual display areas in the virtual environment, each of the plurality of virtual display areas being configured to receive a virtual item for display in the virtual environment, the method further comprising:

identifying a target display area of the plurality of virtual display areas for display of the selected virtual item based on the projected virtual trajectory for the selected virtual item and the attractive force associated with each of the plurality of virtual display areas; and displaying the content of the selected virtual item in the virtual environment, at the target display area identified as the target recipient.

6. The method of claim 5, identifying the target display area of the plurality of virtual target display areas including:

detecting the attractive force associated with each of the plurality of display areas based on a comparison of the characteristic of the selected virtual item and the characteristic of the respective virtual display area; and identifying the target display area of the plurality of display areas as the target recipient for display of the content of the selected virtual item based on the projected virtual trajectory for the selected virtual item and the detected attractive force.

7. The method of claim 6, wherein the characteristic of the respective virtual display areas includes at least one of a virtual size of the virtual display area, a virtual orientation of the virtual display area, or a virtual texture of the of the virtual display area.

8. The method of claim 6, displaying the content of the selected virtual item at the target display area identified as the target recipient including at least one of:

re-sizing a virtual item previously displayed at the target display area identified as the target recipient to accommodate display of the selected virtual item at the target display area identified as the target recipient; or eliminating a virtual item previously displayed at the target display area identified as the target recipient to accommodate display of the selected virtual item at the target display area identified as the target recipient.

9. The method of claim 1, wherein identifying the target recipient includes identifying the target recipient from a plurality of virtual storage areas in the virtual environment, each of the plurality of virtual storage areas being configured to receive a virtual item for storage, the method further comprising:

identifying a target storage area of the plurality of virtual storage areas to receive the selected virtual item based on the projected virtual trajectory for the selected virtual item and the respective attractive force associated with each of the plurality of virtual storage areas; and sharing the content of the selected virtual item in the target storage area identified as the target recipient.

10. The method of claim 9, identifying the target storage area including:

detecting the respective attractive force associated with each of the plurality of virtual storage areas based on a comparison of the characteristic of the selected virtual item and the characteristic of the respective virtual storage area; and identifying the target storage area from the plurality of virtual storage areas as the target recipient for receiving of the selected virtual item based on the projected virtual trajectory of the selected virtual item and the detected attractive force.

11. The method of claim 10, wherein the characteristic of the target storage area includes at least one of an item classification type, a share setting, or a designated destination.

12. A computing device, comprising:
a memory storing executable instructions; and
a processor configured to execute the instructions, to cause the computing device to:
generate a virtual environment;
receive a selection of a virtual item by a selection device in virtual contact with the selected virtual item, the selected virtual item representing content associated with the selected virtual item;
track movement of the selection device in contact with the selected virtual item, and project a virtual trajectory for propulsion of the selected virtual item based on the tracked movement of the selected virtual item;
identify a target recipient for the selected virtual item, including:
detect a plurality of possible recipients in the virtual environment, the plurality of possible recipients corresponding to a respective plurality of virtual representations in the virtual environment;
detect an attractive force associated with each of the plurality of possible recipients, the attractive force being based on a commonality between a characteristic of the content of the selected virtual item and a characteristic of each of the plurality of possible recipients; and
identify the target recipient based on the projected virtual trajectory for the propulsion of the selected virtual item and the attractive force associated with each of the plurality of possible recipients; and
share the content of the selected virtual item with the target recipient.

13. The computing device of claim 12, wherein, in detecting an attractive force associated with each of the plurality of possible recipients, the instructions cause the computing device to detect at least one of:
an existing association between a user of the selection device or the selected virtual item and one or more of the plurality of possible recipients;
an existing share request from one or more of the plurality of possible recipients;
a sharing history between a user of the selection device or the selected virtual item and one or more of the plurality of possible recipients; or
a common format type between the selected virtual item and one or more of the plurality of possible recipients.

14. The computing device of claim 12, wherein, in tracking movement of the selection device in virtual contact with the selected virtual item, the instructions cause the computing device to:
track a six degree of freedom movement of a hand of a user through a throwing movement of the hand of the user;
project the virtual trajectory for the selected virtual item based on the tracked throwing movement of the hand of the user; and identify the target recipient based on an extension of the projected virtual trajectory to one of the plurality of possible recipients in the virtual environment.

15. The computing device of claim 14, wherein, in identifying the target recipient, the instructions cause the computing device to:
identify the target recipient from a plurality of additional users sharing the virtual environment; and
detect the attractive force associated with each of the plurality of additional users in the virtual environment, the attractive force associated with each additional user in the virtual environment being based on at least one of:
an established association between a user of the selection device or the selected virtual item and the user identified as the target recipient; or
a request for sharing of the content of the virtual item from the user identified as the target recipient.

16. The computing device of claim 14, wherein, in identifying the target recipient, the instructions cause the computing device to:
identify the target recipient from a plurality of virtual display areas in the virtual environment, each of the plurality of virtual display areas being configured to receive at least one virtual item for display in the virtual environment; and
identify a virtual target display area of the plurality of virtual display areas for display of the selected virtual item based on the projected virtual trajectory for the selected virtual item; and
display the content of the selected virtual item in the virtual environment, at the virtual target display area identified as the target recipient.

17. The computing device of claim 16, wherein, in identifying the virtual target display area of the plurality of virtual display areas, the instructions cause the computing device to:
detect the attractive force associated with each of the plurality of virtual display areas based on a comparison of the characteristic of the selected virtual item and the characteristic of the respective display area; and
identify the virtual target display area of the plurality of target display areas as the target recipient for display of the selected virtual item based on the projected virtual trajectory for the selected virtual item and the detected attractive force.

18. The computing device of claim 12, wherein, in identifying the target recipient, the instructions cause the computing device to:
identify the target recipient from a plurality of virtual storage areas in the virtual environment, each of the plurality of virtual storage areas being configured to receive a virtual item for storage; and
identify a virtual target storage area of the plurality of virtual target storage areas to receive the content of the selected virtual item based on the projected virtual trajectory for the selected virtual item and a comparison of the attractive forces associated with each of the plurality of virtual target storage areas; and
share the content of the selected virtual item in the virtual target storage area identified as the target recipient.

* * * * *